(12) United States Patent
Levinbook et al.

(10) Patent No.: US 11,784,852 B2
(45) Date of Patent: Oct. 10, 2023

(54) DEVICE AND METHOD FOR DYNAMICALLY REDUCING INTERFERENCE

(71) Applicant: Huawei Technologies Co., Ltd., Shenzhen (CN)

(72) Inventors: Yoav Levinbook, Hod Hasharon (IL); Doron Ezri, Hod Hasharon (IL); Nadav Basson, Hod Hasharon (IL); Jie Fu, Nanjing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 17/703,705

(22) Filed: Mar. 24, 2022

(65) Prior Publication Data

US 2022/0217019 A1    Jul. 7, 2022

Related U.S. Application Data

(63) Continuation of application No. PCT/EP2019/078114, filed on Oct. 16, 2019.

(51) Int. Cl.
*H04L 25/02* (2006.01)
*H04L 5/00* (2006.01)

(52) U.S. Cl.
CPC ........ *H04L 25/0224* (2013.01); *H04L 5/0046* (2013.01); *H04L 5/0048* (2013.01)

(58) Field of Classification Search
CPC . H04L 25/0224; H04L 5/0046; H04L 5/0048; H04L 2025/03414; H04L 25/021; H04L 25/03305; H04B 7/0854
See application file for complete search history.

(56) References Cited

U.S. PATENT DOCUMENTS 9,954,596 B2 * 4/2018 Wu ..................... H04L 25/0228
2010/0260237 A1   10/2010 Jonsson
(Continued)

FOREIGN PATENT DOCUMENTS

| CN | 102447656 A | 5/2012 |
|---|---|---|
| CN | 102792653 A | 11/2012 |

(Continued)

OTHER PUBLICATIONS

Cui, Zhi-fu, et al., "External Interference Cancelation and Blind Multi-user Detection of DS-CDMA System Based on Non-gaussianity Measure", with English abstract, Computer Science, vol. 40, No. 1, Jan. 2013, 6 pages.

*Primary Examiner* — Kabir A Timory
(74) *Attorney, Agent, or Firm* — Slater Matsil, LLP

(57) ABSTRACT

A device is configured to calculate a set of channel estimates for a plurality of sub-carriers based on a plurality of pilot-symbols and/or data-symbols carried by said plurality of sub-carriers; calculate a set of equalizers for the plurality of sub-carriers based on the set of channel estimates; perform an equalization on a plurality of data-symbols using the set of equalizers for obtaining a plurality of equalized symbols; perform a soft-slicing or hard-slicing procedure comprising obtaining a plurality of estimated symbols based on the equalized symbols; calculate at least one diagonal-loaded interference-plus-noise covariance matrix, based on the set of estimated symbols; de-map the plurality of data symbols to soft-bits, based on the at least one diagonal-loaded interference-plus-noise covariance matrix, the set of channel estimates or an updated version thereof; and feed the soft-bits to a channel decoder.

20 Claims, 13 Drawing Sheets

(56) References Cited

U.S. PATENT DOCUMENTS

| | | | |
|---|---|---|---|
| 2012/0243502 A1 | 9/2012 | Lindqvist et al. |
| 2015/0131758 A1 | 5/2015 | Chen et al. |
| 2016/0344459 A1 | 11/2016 | Chen et al. |
| 2017/0063574 A1 | 3/2017 | Jalloul |
| 2017/0324462 A1 | 11/2017 | Chen et al. |

FOREIGN PATENT DOCUMENTS

| | | | |
|---|---|---|---|
| CN | 103404068 A | 11/2013 |
| CN | 104702540 A | 6/2015 |
| CN | 105900489 A | 8/2016 |
| EP | 2779547 A1 | 9/2014 |
| EP | 3261308 A1 | 12/2017 |
| WO | 2014105202 A1 | 7/2014 |

\* cited by examiner

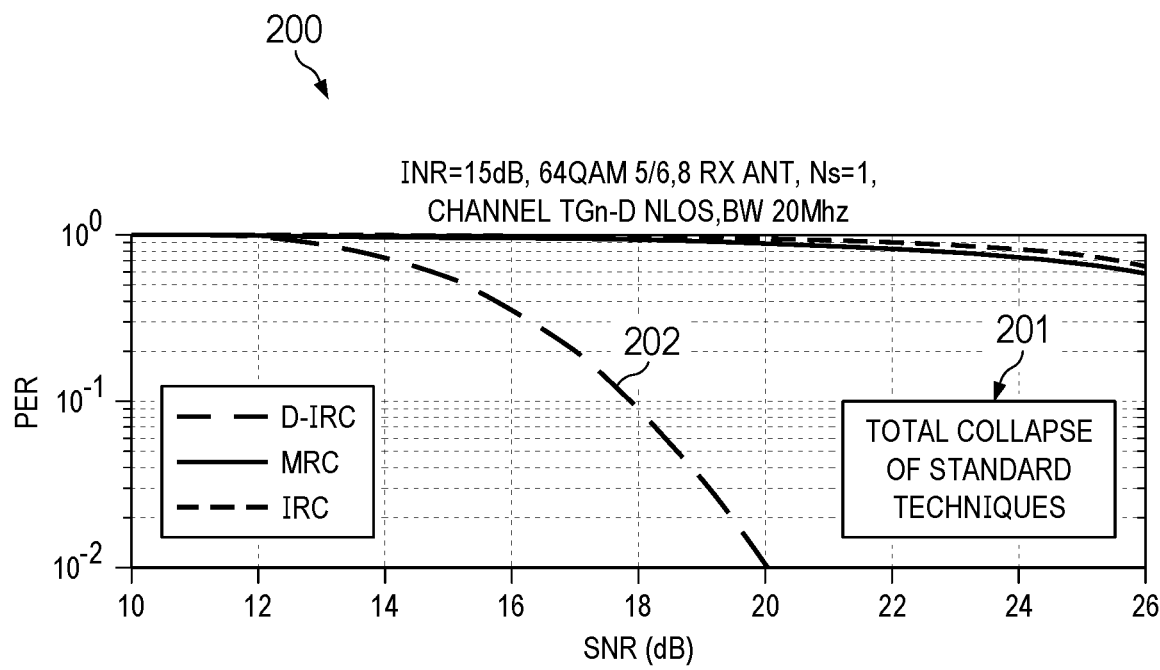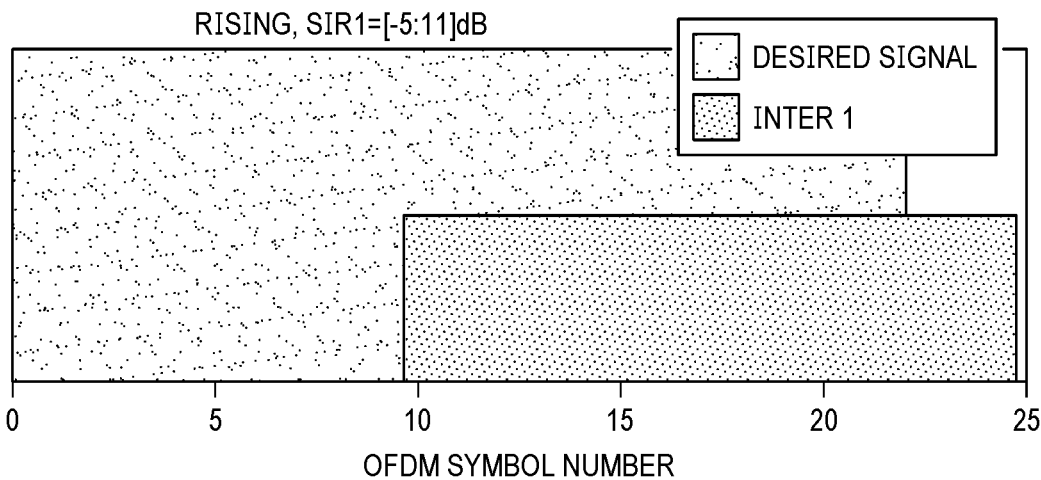
FIG. 2

DEVICE AND METHOD FOR DYNAMICALLY REDUCING INTERFERENCE

CROSS-REFERENCE TO RELATED APPLICATIONS

This application is a continuation of International Application No. PCT/EP2019/078114, filed on Oct. 16, 2019, the disclosure of which is hereby incorporated by reference in its entirety.

TECHNICAL FIELD

This disclosure relates generally to the field of wireless local area networks, and particularly, to dynamic interference cancellation in wireless local area networks. To this end, this disclosure provides a device for a multicarrier communication receiver, and a corresponding method, which may detect a drop in post-processing Signal-to-Noise-Ratio (pp-SNR) level, and may enable Dynamic Interference Rejection Combining (D-IRC).

BACKGROUND

Generally, the performance of a wireless local area network (for example, WiFi performance) is often interference limited as opposed to noise.

For example, there may be several scenarios of interference in WiFi, as follows:
 Interference can be WiFi or Non-WiFi.
 Interference can be static interference or dynamic interference.

FIG. 9 schematically illustrates a diagram 900 of static interference. In the static interference (as it can be derived from diagram 900), the interferer(s) power (statistics) remains fixed during the whole desired packet (including the preamble).

FIG. 10 schematically illustrates a diagram 1000 of dynamic interferences, including Rising 1001, Falling 1002, Rising+falling 1003, and Falling+rising 1004 interferences.

In the dynamic interference (as it can be derived from diagram 1000), the interferer(s) power (statistics) changes within the duration of the desired packet.

Moreover, even a relatively weak rising interferer can cause serious degradation, if the required Signal-to-Noise-ratio (SNR) for the given Multi-Carrier communication System (MCS) is not met. This is depicted in FIG. 11, which is a schematic view of a diagram 1100 illustrating Maximum Ratio Combining (MRC) and Interference Rejection Combining (IRC) performance in the case of no interference, static interference, and rising interference.

The WiFi interference is, in general, not synchronized to the desired packet, for example, it may rise or fall anywhere within the desired packet. Moreover, the WiFi interferer nature may change within the packet due to, for example, transitions in portions of preamble, transition from single stream to multi stream, etc. Therefore, the pure static case may be a case when these transitions do not occur within the desired packet (i.e., rather a rare case).

Furthermore, the dynamic interference is very problematic for the WiFi, since in the WiFi (except for very few phase tracking pilots intended for Carrier Frequency Offset (CFO)/phase noise compensation), there are no pilots after the preamble. This means that it may be difficult to detect and mitigate an interference that rises after the preamble.

Perhaps the most important case of dynamic interference is that of rising interference. The Rising-interference case is due to Hidden-node.

Reference is made to FIG. 12 which is a schematic view of a diagram 1200 illustrating the Hidden-node problem.

In the diagram 1200, B 1201 is the Access Point (AP), A 1202 is a Station (STA) that is not sensing C 1203 and transmitting to the B 1201. Moreover, C 1203 is STA that is not sensing the A 1202 and transmitting to B 1201 or another AP. Moreover, C 1203 may also be also another AP transmitting to one of its STAs.

Besides, some other important scenarios are combinations of rising and falling interferences such as the Rising+falling interference case. This scenario may occur due to Hidden-node, where the Hidden-node packet ends before the desired packet ends. Also, the dynamic interference mitigation is essential to handle the rising interference. In addition, another scenario is the Falling+rising interference scenario. For example, it may happen due to Message in Message (MIM) followed by acknowledgment (ACK) (for example, message 1 (MSG1) packet ends before message 2 (MSG2)), however, there are other scenarios as well. In the latter case, rising interferer is different than falling interferer and the dynamic interference mitigation is essential.

Furthermore, some of the other cases in which dynamic interference mitigation may help are as follows:
 Combinations of more than one simultaneous interferers (possibly rising and/or falling), for example, nested Hidden-nodes.
 Interference that changes within the preamble or static/falling interference in which the nature of interference changes within the packet.

For instance, if the interferences described in the different scenarios discussed above is not mitigated, it may cause the WiFi to possibly work in a much lower MCS than in the case of no interference, thus reducing considerably the throughput. So, even if the AP and the STA being located very close, the data rate may be rather low.

The problem of dynamic interference in WiFi (such as rising interference) has not been solved explicitly to date in the sense that there is no solution for mitigating the dynamic interference. This means that in practice the rate adaptation algorithm (e.g., Minstrel) would converge to an MCS that is low enough to support the interference level. This means however that the throughput is significantly decreased due to the dynamic interference.

Furthermore, unlike the problem of dynamic interference, the problem of static interference has a known solution using the IRC.

Moreover, in a hypothetical system (for example, the system 1300 of FIG. 13) a general model of y=hs+v may be considered, where v is the interference+noise with the Covariance of C, h is the channel vector, and s is the transmitted preamble. If assuming a perfect channel knowledge and interference statistics knowledge, the optimal detection (for Gaussian interference) is the Minimum Variance Distortionless Response (MVDR), in which:

$$\hat{s} = \frac{h^H C^{-1} y}{h^H C^{-1} h}. \qquad \text{Eq. (1)}$$

by using the matrix inversion lemma, it may be possible to replace $C^{-1}$ with $R^{-1}$, where:

$$R = C + hh^H = E(yy^H). \qquad \text{Eq. (2)}$$

This shows that, it may be possible to work with the total Covariance R instead of C.

Furthermore, by relaxing the assumption of perfect channel and interference statistic knowledge, there are two main approaches as follows:
1. The IRC based on R (Scaled Minimum Mean Square Error (MMSE): that may be described by Eq. (3), Eq. (4), and Eq. (5), as follows:

$$\hat{s} = w^T y, \quad \text{Eq. (3)}$$

$$w^T = \frac{\hat{h}^H \hat{R}^{-1}}{\hat{h}^H \hat{R}^{-1} \hat{h}}, \quad \text{Eq. (4)}$$

$$\hat{R} = \frac{1}{N} \sum_{i=1}^{N} y_n y_n^H, \quad \text{Eq. (5)}$$

where $\hat{h}$ is the channel estimate ($\hat{R}$ is calculated over a band of N sub-carriers).
2. The IRC based on C (Whitening/Minimum Variance Distortionless Response (MVDR)), that may be described by Eq. (6), Eq. (7), and Eq. (8), as follows:

$$\hat{s} = \frac{\tilde{h}^H}{|\tilde{h}|^2} \tilde{y} = \frac{\hat{h}^H \hat{C}^{-1} y}{\hat{h}^H \hat{C}^{-1} \hat{h}}, \quad \text{Eq. (6)}$$

where, $$\tilde{y} = \hat{C}^{-1/2} y, \tilde{h} = \hat{C}^{-1/2} \hat{h}, \quad \text{Eq. (7)}$$

and $$\hat{C} = \frac{1}{N} \sum (y_n - h_n s_n)(y_n - h_n s_n)^H \quad \text{Eq. (8)}$$

is the estimate for the Covariance C (e.g., $\hat{C}$ may be calculated over a band of N sub-carriers).

These two approaches are in general not identical for practical channel estimation (e.g., smoothing used in Wi-Fi or Long Term Evolution (LTE)). For example, the IRC is used extensively in LTE where the interference nature is more static.

Moreover, while the preamble based IRC performs well in the static interference case, in general, it does not null a rising interferer. For instance, the IRC fails if the interferer rises or changes after preamble because the beamformer calculated at the preamble is unsuitable. In the case of Wi-Fi the preamble is in the beginning of the packet and there are no sufficient pilots afterwards so IRC can help only in limited number of cases. Thus IRC is not an adequate solution for Wi-Fi. This may also be derived from diagram 1100 illustrated in FIG. 11, which shows that (preamble based) IRC works very well when the interferer is static, whereas there is total loss when (preamble based) IRC is used for rising interferer.

SUMMARY

In view of the above-mentioned problems and disadvantages, embodiments of this disclosure aim to improve the conventional devices and methods. An objective is to solve the technical problem of dynamic interference in WiFi, by mitigating the interferer, thus increasing the post-processing SINR and as a consequence increasing throughput.

The objective is achieved by the embodiments provided in the enclosed independent claims. Advantageous implementations of the embodiments are further defined in the dependent claims.

In particular the embodiments of this disclosure propose estimating the covariance like in IRC and (only that) the unknown symbols $s_n$ are replaced by $\bar{s}_n$, which is the soft-slicing symbols according to $$\hat{C} = \frac{1}{N} \sum (y_n - \hat{h}_n \bar{s}_n)(y_n - \hat{h}_n \bar{s}_n)^H, \quad \text{Eq. (9)}$$

where $$\bar{s}_n = s_{mid\_r,n} + \tan h(2\gamma_n(\text{Re}(\hat{s}_n) - s_{mid\_r,n})) + j(s_{mid\_i,n} + \tan h(2\gamma_n(\text{Im}(\hat{s}_n) - s_{mid\_i,n}))),$$

$$\hat{s}_n = w^T y_n,$$

$s_{mid\_r,n}$=middle point between the PAM constellation points closest to $\text{Re}(\hat{s}_n)$
$s_{mid\_i,n}$=middle point between the PAM constellation points closest to $\text{Im}(\hat{s}_n)$
$\gamma_n$=post processing SNR Moreover, an iterative algorithm may be used to refine the symbols $\bar{s}_n$ and as a consequence refine the covariance and beamformer. Furthermore, a post-processing SNR detector may be used to detect the rising/dynamic interference and enable D-IRC only when it is necessary. This may enable having no degradation in the case of no interference or static interference and in the meantime may have (huge) gains in the case of dynamic interference.

The main advantages of the embodiments of this disclosure can be summarized as follows:
Achieving a significant performance gain in the presence of dynamic interference.
No negative gain (no degradation when there is no interferer or there is static interferer).
Feasible computational complexity.

A first aspect of this disclosure provides a device for dynamically reducing interference for a multi-carrier communication receiver, wherein the device is configured to calculate a set of channel estimates for a plurality of sub-carriers based on a plurality of pilot-symbols and/or data-symbols carried by said plurality of sub-carriers; calculate a set of equalizers for the plurality of sub-carriers based on the set of channel estimates; perform an equalization on a plurality of data-symbols using the set of equalizers for obtaining a plurality of equalized symbols; perform a soft-slicing or hard-slicing procedure comprising obtaining a plurality of estimated symbols based on the equalized symbols; calculate at least one diagonal-loaded interference-plus-noise covariance matrix, based on the set of estimated symbols; de-map the plurality of data symbols to soft-bits, based on the at least one diagonal-loaded interference-plus-noise covariance matrix, the set of channel estimates or an updated version thereof; and feed the soft-bits to a channel decoder.

The device, may be or may incorporated in, a multi-carrier communication receiver. The device may comprise a circuitry. The circuitry may comprise hardware and software. The hardware may comprise analog or digital circuitry, or both analog and digital circuitry. In some embodiments, the circuitry comprises one or more processors and a non-volatile memory connected to the one or more processors. The non-volatile memory may carry executable program code which, when executed by the one or more processors, causes the device to perform the operations or methods described herein.

For example, in some embodiments, the device may be supplied with a dynamic interference mitigation scheme which may use a detector based on post-processing SNR to decide whether to use (the conventional) MRC method or IRC method or to switch to the dynamic IRC (D-IRC), for example, once an SNR drop is detected the switch is done. The device may use the D-IRC. The D-IRC principles are based on IRC. IRC in the static interference case is straightforward since it can be done on the preamble. In the dynamic interference case, the difficulty comes from the fact that the interference nature changes after the preamble so it cannot be used (no pilots within the payload in Wi-Fi).

For example, in some embodiments, the device may use the received data symbols to estimate the covariance of the interference and may further apply IRC/whitening. The difficulty in this approach may come from the fact that the data symbols are unknown to the receiver. In some embodiments, one possibility is to use hard-decisions, but in some embodiments a more general approach may be using soft-slicing (e.g., based on conditional mean estimator) instead of hard-decisions to estimate the covariance (e.g., the hard decision can be seen as a special case of soft-slicing).

In some embodiments, (a difficulty may be the fact that) soft-slicing may require the knowledge of beamformer/equalizer (which requires the soft-slicing) and soft-slicing also requires knowledge of post-processing SNR, which is also unknown before beamformer/equalizer is calculated. To overcome this (i.e., "chicken and egg") problem, the device may perform following steps:
1. The device may obtain the initial beamformer/equalizer ($w_0$) and post-processing SNR ($ppSNR_0$) from previous symbol.
2. For i=1:Number of Iterations, the device may
    a. perform soft-slicing,
    b. estimate the covariance and recalculate the beamformer/equalizer–$w_i$,
    c. recalculate the post-processing SNR–$ppSNR_i$.
3. The device may use the last calculated beamformer/equalizer for equalization.
4. The device may use the last calculated post-processing SNR for Log Likelihood ratio (LLR) scaling.

The provided D-IRC scheme is not limited to the case of a single stream and can be used in Single User Multiple-Input and Multiple-Output (SU-MIMO) and Multi User (MU-MIMO).

In an implementation form of the first aspect, the device is further configured to calculate a subsequent set of equalizers for the plurality of sub-carriers, based on the at least one diagonal-loaded interference-plus-noise covariance matrix and the set of channel estimates or an updated version thereof.

In a further implementation form of the first aspect, the device is further configured to calculate at least one whitening matrix based on the calculated at least one diagonal-loaded interference-plus-noise covariance matrix; calculate the subsequent set of equalizers for the plurality of sub-carriers based on the at least one whitening matrix; and de-map the plurality of data symbols into soft-bits, based on the at least one whitening matrix.

In a further implementation form of the first aspect, the device is further configured to perform a whitening operation on the plurality of data-symbols, using the calculated at least one whitening matrix, for obtaining a plurality of whitened data symbols; perform a whitening operation on either the set of channel estimates or an updated version thereof, using the calculated at least one whitening matrix, for obtaining a set of whitened channel estimates; calculate the subsequent set of equalizers for the plurality of sub-carriers based on the set of whitened channel estimates; and obtain the soft-bits by performing a de-mapping operation on the whitened data symbols, based on the subsequent set of equalizers and/or the whitened channel estimates.

In some embodiments, the calculation of the pp-SNR may not be necessary, e.g., if the soft-slicing is replaced by hard decision, for example, the pp-SNR is not critical for performance.

In some embodiments, in Maximum likelihood decoding (MLD) decoder, the subsequent set of equalizers is used only on the next symbol; only whitening is done on the plurality of data-symbols. In some embodiments, in the case of linear receiver, whitening can be absorbed into the equalizer. In some embodiments, the whitening may not be done implicitly but may be performed explicitly through the equalization.

In some embodiments, in both the single stream and the multi stream case, the whitening+equalization can be done in several ways (all are mathematically equivalent), as follows:
1. The input vector may be whitened and the channel estimates may be whitened. Then equalizer may be calculated based on whitened channel estimates.
2. Whitening can be done explicitly by absorbing the whitening operation of both the input and channel estimates into the equalizer.
3. A combination of 1 and 2, e.g., whitening may be performed on the input and the channel estimates. Whitening may be absorbed into the equalizer or the input whitening may be absorbed into the equalizer and the equalizer may be based on whitened channel estimates.

In a further implementation form of the first aspect, the device is further configured to calculate at least one interference-plus-noise covariance matrix and add a diagonal matrix to the at least one interference-plus-noise covariance matrix for calculating the at least one diagonal-loaded interference-plus-noise covariance matrix.

In a further implementation form of the first aspect, the device is further configured to calculate an inverse Cholesky matrix of the at least one diagonal-loaded interference-plus-noise covariance matrix.

For example, the device may calculate the inverse Cholesky matrix of the at least one diagonal-loaded interference-plus-noise covariance matrix based on obtaining a triangular matrix by performing a Cholesky decomposition on the at least one diagonal-loaded interference-plus-noise covariance matrix; and inverting the obtained triangular matrix.

In a further implementation form of the first aspect, the inverse Cholesky matrix is calculated by performing a Cholesky decomposition on the at least one diagonal-loaded interference-plus-noise covariance matrix.

In a further implementation form of the first aspect, performing the whitening and equalization comprises whitening a received input vector for a determined subcarrier, SC, based on the inverse Cholesky matrix and subsequently applying the subsequent set of equalizers on the whitened input vector for the determined SC; or applying the subsequent set of equalizers on the inverse Cholesky matrix and subsequently applying the obtained result on a received input vector for a determined subcarrier.

In a further implementation form of the first aspect, the device is further configured to perform an inner-iteration procedure comprising performing a predefined number of inner-iterations, wherein each inner-iteration is performed on the same plurality of data-symbols, and wherein in each inner-iteration, the following steps are performed:

performing the equalization using the set of equalizers calculated in the previous inner-iteration or in the case of first inner-iteration using the set of equalizers calculated for the plurality of sub-carriers based on the set of channel estimates, performing the soft-slicing procedure or the hard-slicing procedure, calculating the at least one diagonal-loaded interference-plus-noise covariance matrix, calculating the at least one whitening matrix, performing the whitening operation on the plurality of data-symbols, performing the whitening operation for obtaining the set of whitened channel estimates, and calculating another set of equalizers.

In a further implementation form of the first aspect, the device is further configured to perform an outer-iteration procedure comprising performing a predefined number of outer-iterations, wherein each outer-iteration is performed on a different plurality of data-symbols than the previous outer-iteration, and wherein in each outer-iteration the following steps are performed:

performing the equalization using the set of equalizers calculated in the previous outer-iteration or an inner-iteration or in the case of first outer-iteration using the set of equalizers calculated for the plurality of sub-carriers based on the set of channel estimates, performing the soft-slicing procedure or the hard-slicing procedure, calculating the at least one diagonal-loaded interference-plus-noise covariance matrix, calculating the at least one whitening matrix, performing the whitening operation on the plurality of data-symbols, performing the whitening operation for obtaining the set of whitened channel estimates, and calculating another set of equalizers.

In a further implementation form of the first aspect, the whitened channel estimates are obtained by multiplying at least one channel estimates matrix for a determined SC or the updated version thereof by the calculated at least one whitening matrix, in particular the inverse Cholesky matrix.

In a further implementation form of the first aspect, the device is further configured to divide a plurality of SCs into sub-bands, wherein each sub-band comprises a predetermined number of SCs, and wherein an interference-plus-noise covariance matrix is estimated per each sub-band.

In a further implementation form of the first aspect, the device is further configured to calculate a first set of per-stream post processing Signal-to-Interference-Plus-Noise Ratio (pp-SINR) for a plurality of sub-carriers based on a plurality of pilot-symbol and/or data-symbols and/or the set of channel estimates carried by said plurality of sub-carriers; and calculate a second set of per stream pp-SINR, for the plurality of sub-carriers based on a plurality of equalized symbols and a plurality of estimated symbols.

In a further implementation form of the first aspect, the device is further configured to calculate from the first set of per-stream pp-SINR a single per-stream pp-SINR vector representing an average pp-SINR of the first set; calculate from the second set of per-stream pp-SINR a single per-stream pp-SINR vector representing an average pp-SINR of the second set; calculate pp-SINR difference vector as the difference between the average pp-SINR of the first set and the average pp-SINR of the second set.

In a further implementation form of the first aspect, the device is further configured to detect a drop in pp-SINR level, for the plurality of SCs.

In a further implementation form of the first aspect, the drop in the pp-SINR is detected based on the pp-SINR difference vector.

In a further implementation form of the first aspect, the device is enabled, in particular, wherein the predefined number of inner-iterations and/or outer-iterations is determined, based on a detected drop in pp-SINR level.

In a further implementation form of the first aspect, the set of equalizers and/or the subsequent set of equalizers is based on a Minimum Mean Square Error (MMSE) equalizer or a Zero Forcing (ZF) equalizer.

A second aspect of this disclosure provides a method for dynamically reducing interference for a multi-carrier communication receiver, wherein the method comprises calculating a set of channel estimates for a plurality of sub-carriers based on a plurality of pilot-symbols and/or data-symbols carried by said plurality of sub-carriers; calculating a set of equalizers for the plurality of sub-carriers based on the set of channel estimates; performing an equalization on a plurality of data-symbols using the first set of equalizers for obtaining a plurality of equalized symbols; performing a soft-slicing or hard-slicing procedure comprising obtaining a plurality of estimated symbols based on the equalized symbols; calculating at least one diagonal-loaded interference-plus-noise covariance matrix, based on the set of estimated symbols; de-mapping the plurality of data symbols to soft-bits, based on the at least one diagonal-loaded interference-plus-noise covariance matrix, the first set of channel estimates or an updated version thereof; and feeding the soft-bits to a channel decoder.

In an implementation form of the second aspect, the method further comprises calculating a subsequent set of equalizers for the plurality of sub-carriers, based on the at least one diagonal-loaded interference-plus-noise covariance matrix and the set of channel estimates or an updated version thereof.

In a further implementation form of the second aspect the method further comprises calculating at least one whitening matrix based on the calculated at least one diagonal-loaded interference-plus-noise covariance matrix; calculating the subsequent set of equalizers for the plurality of sub-carriers based on the at least one whitening matrix; and de-mapping the plurality of data symbols into soft-bits, based on the at least one whitening matrix.

In a further implementation form of the second aspect, the method further comprises performing a whitening operation on the plurality of data-symbols, using the calculated at least one whitening matrix, for obtaining a plurality of whitened data symbols; performing a whitening operation on either the set of channel estimates or an updated version thereof, using the calculated at least one whitening matrix, for obtaining a set of whitened channel estimates; calculating the subsequent set of equalizers for the plurality of sub-carriers based on the set of whitened channel estimates; and obtaining the soft-bits by performing a de-mapping operation on the whitened data symbols, based on the subsequent set of equalizers and/or the whitened channel estimates.

In a further implementation form of the second aspect, the method further comprises calculating at least one interference-plus-noise covariance matrix and add a diagonal matrix to the at least one interference-plus-noise covariance matrix for calculating the at least one diagonal-loaded interference-plus-noise covariance matrix.

In a further implementation form of the second aspect, the method further comprises calculating an inverse Cholesky matrix of the at least one diagonal-loaded interference-plus-noise covariance matrix.

In a further implementation form of the second aspect, the inverse Cholesky matrix is calculated by performing a Cholesky decomposition on the at least one diagonal-loaded interference-plus-noise covariance matrix.

In a further implementation form of the second aspect, performing the whitening and equalization comprises whitening a received input vector for a determined subcarrier, SC, based on the inverse Cholesky matrix and subsequently applying the subsequent set of equalizers on the whitened input vector for the determined SC; or applying the subsequent set of equalizers on the inverse Cholesky matrix and subsequently applying the obtained result on a received input vector for a determined subcarrier.

In a further implementation form of the second aspect, the method further comprises performing an inner-iteration procedure comprising performing a predefined number of inner-iterations, wherein each inner-iteration is performed on the same plurality of data-symbols, and wherein in each inner-iteration, the following steps are performed:

performing the equalization using the set of equalizers calculated in the previous inner-iteration or in the case of first inner-iteration using the set of equalizers calculated for the plurality of sub-carriers based on the set of channel estimates, performing the soft-slicing procedure or the hard-slicing procedure, calculating the at least one diagonal-loaded interference-plus-noise covariance matrix, calculating the at least one whitening matrix, performing the whitening operation on the plurality of data-symbols, performing the whitening operation for obtaining the set of whitened channel estimates, and calculating another set of equalizers.

In a further implementation form of the second aspect, the method further comprises performing an outer-iteration procedure comprising performing a predefined number of outer-iterations, wherein each outer-iteration is performed on a different plurality of data-symbols than the previous outer-iteration, and wherein in each outer-iteration the following steps are performed:

performing the equalization using the set of equalizers calculated in the previous outer-iteration or an inner-iteration or in the case of first outer-iteration using the set of equalizers calculated for the plurality of sub-carriers based on the set of channel estimates, performing the soft-slicing procedure or the hard-slicing procedure, calculating the at least one diagonal-loaded interference-plus-noise covariance matrix, calculating the at least one whitening matrix, performing the whitening operation on the plurality of data-symbols, performing the whitening operation for obtaining the set of whitened channel estimates, and calculating another set of equalizers.

In a further implementation form of the second aspect, the whitened channel estimates are obtained by multiplying at least one channel estimates matrix for a determined SC or the updated version thereof by the calculated at least one whitening matrix, in particular the inverse Cholesky matrix.

In a further implementation form of the second aspect, the method further comprises dividing a plurality of SCs into sub-bands, wherein each sub-band comprises a predetermined number of SCs, and wherein an interference-plus-noise covariance matrix is estimated per each sub-band.

In a further implementation form of the second aspect, the method further comprises calculating a first set of per-stream post processing Signal-to-Interference-Plus-Noise Ratio, pp-SINR, for a plurality of sub-carriers based on a plurality of pilot-symbol and/or data-symbols and/or the set of channel estimates carried by said plurality of sub-carriers; and calculating a second set of per stream pp-SINR, for the plurality of sub-carriers based on a plurality of equalized symbols and a plurality of estimated symbols.

In a further implementation form of the second aspect, the method further comprises calculating from the first set of per-stream pp-SINR a single per-stream pp-SINR vector representing an average pp-SINR of the first set; calculating from the second set of per-stream pp-SINR a single per-stream pp-SINR vector representing an average pp-SINR of the second set; calculating pp-SINR difference vector as the difference between the average pp-SINR of the first set and the average pp-SINR of the second set.

In a further implementation form of the second aspect, the method further comprises detecting a drop in pp-SINR level, for the plurality of SCs.

In a further implementation form of the second aspect, the drop in the pp-SINR is detected based on the pp-SINR difference vector.

In a further implementation form of the second aspect, the method is enabled, in particular, the predefined number of inner-iterations and/or outer-iterations is determined, based on a detected drop in pp-SINR level.

In a further implementation form of the second aspect, the set of equalizers and/or the subsequent set of equalizers is based on a Minimum Mean Square Error, MMSE, equalizer or a Zero Forcing, ZF, equalizer.

A third aspect of this disclosure provides a computer program which, when executed by a computer, causes the method of second aspect or one of the implementation form of the second aspect to be performed.

In some embodiments, the computer program may be provided on a non-transitory computer-readable recording medium.

It has to be noted that all devices, elements, units and means described in the present application could be implemented in the software or hardware elements or any kind of combination thereof. All steps which are performed by the various entities described in the present application as well as the functionalities described to be performed by the various entities are intended to mean that the respective entity is adapted to or configured to perform the respective steps and functionalities.

Even if, in the following description of specific embodiments, a specific functionality or step to be performed by external entities is not reflected in the description of a specific detailed element of that entity which performs that specific step or functionality, it should be clear for a skilled person that these methods and functionalities can be implemented in respective software or hardware elements, or any kind of combination thereof.

BRIEF DESCRIPTION OF THE DRAWINGS

The above described aspects and implementation forms of this disclosure will be explained in the following description of specific embodiments in relation to the enclosed drawings, in which

FIG. 2 is shows a diagram illustrating results for a scenario of rising interference, arriving in the ~middle of a received frame.

DETAILED DESCRIPTION OF ILLUSTRATIVE EMBODIMENTS

Figure 1:
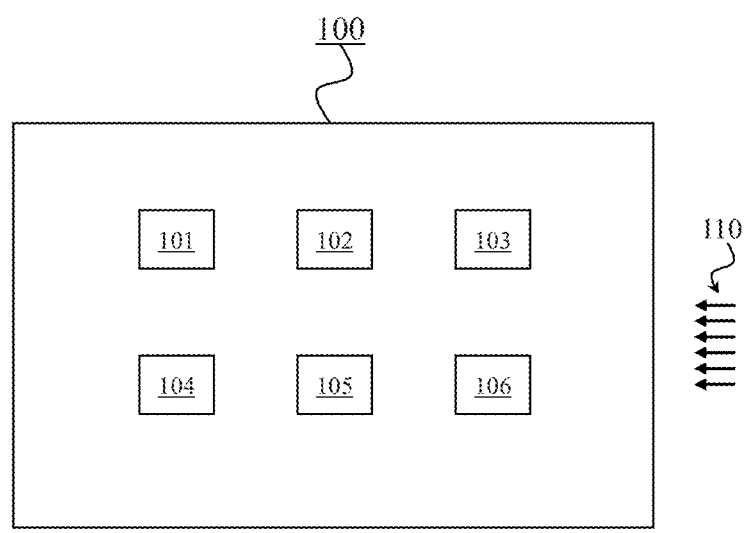
FIG. 1 is a schematic view of a device for dynamically reducing interference for a multi-carrier communication receiver, according to an embodiment of this disclosure.

FIG. 1 is a schematic view of a device 100 for dynamically reducing interference for a multi-carrier communication receiver, according to an embodiment of this disclosure.

The device 100 is configured to calculate a set of channel estimates 101 for a plurality of sub-carriers no based on a plurality of pilot-symbols and/or data-symbols carried by said plurality of sub-carriers 110.

The device 100 is further configured to calculate a set of equalizers 102 for the plurality of sub-carriers no based on the set of channel estimates 101.

The device 100 is further configured to perform an equalization on a plurality of data-symbols using the set of equalizers 102 for obtaining a plurality of equalized symbols 103.

The device 100 is further configured to perform a soft-slicing or hard-slicing procedure comprising obtaining a plurality of estimated symbols 104 based on the equalized symbols 103.

The device 100 is further configured to calculate at least one diagonal-loaded interference-plus-noise covariance matrix 105, based on the set of estimated symbols 104.

The device 100 is further configured to de-map the plurality of data symbols to soft-bits 106, based on the at least one diagonal-loaded interference-plus-noise covariance matrix 105, the set of channel estimates 101 or an updated version thereof.

The device 100 is further configured to feed the soft-bits 106 to a channel decoder.

The device 100 may be a receiver device. The device 100 may comprise a circuitry (not shown in FIG. 1). The circuitry may comprise hardware and software. The hardware may comprise analog or digital circuitry, or both analog and digital circuitry. In some embodiments, the circuitry comprises one or more processors and a non-volatile memory connected to the one or more processors. The non-volatile memory may carry executable program code which, when executed by the one or more processors, causes the device to perform the operations or methods described herein.

Moreover, the device 100 may achieve a significant performance gain in the presence of dynamic interferer. Reference is made to FIG. 2 which is a schematic view of a diagram 200 illustrating results for scenario of rising interference, arriving in the ~middle of a received frame.

In the diagram 200 of FIG. 2, a comparison of the performance of D-IRC to MRC and IRC is illustrated, in the case of fixed INR of 15 dB for 64QAM, rate 5/6. The receiver (RX) uses 8Rx antennas and the channel is TGn-D NLOS. It can be seen that the D-IRC enables working in SNR of ~18 dB (as it is indicated with the reference 202), while it is not possible to work with the IRC and/or the MRC (indicated with the reference 201 indicating a total collapse of standard techniques).

Figure 3:
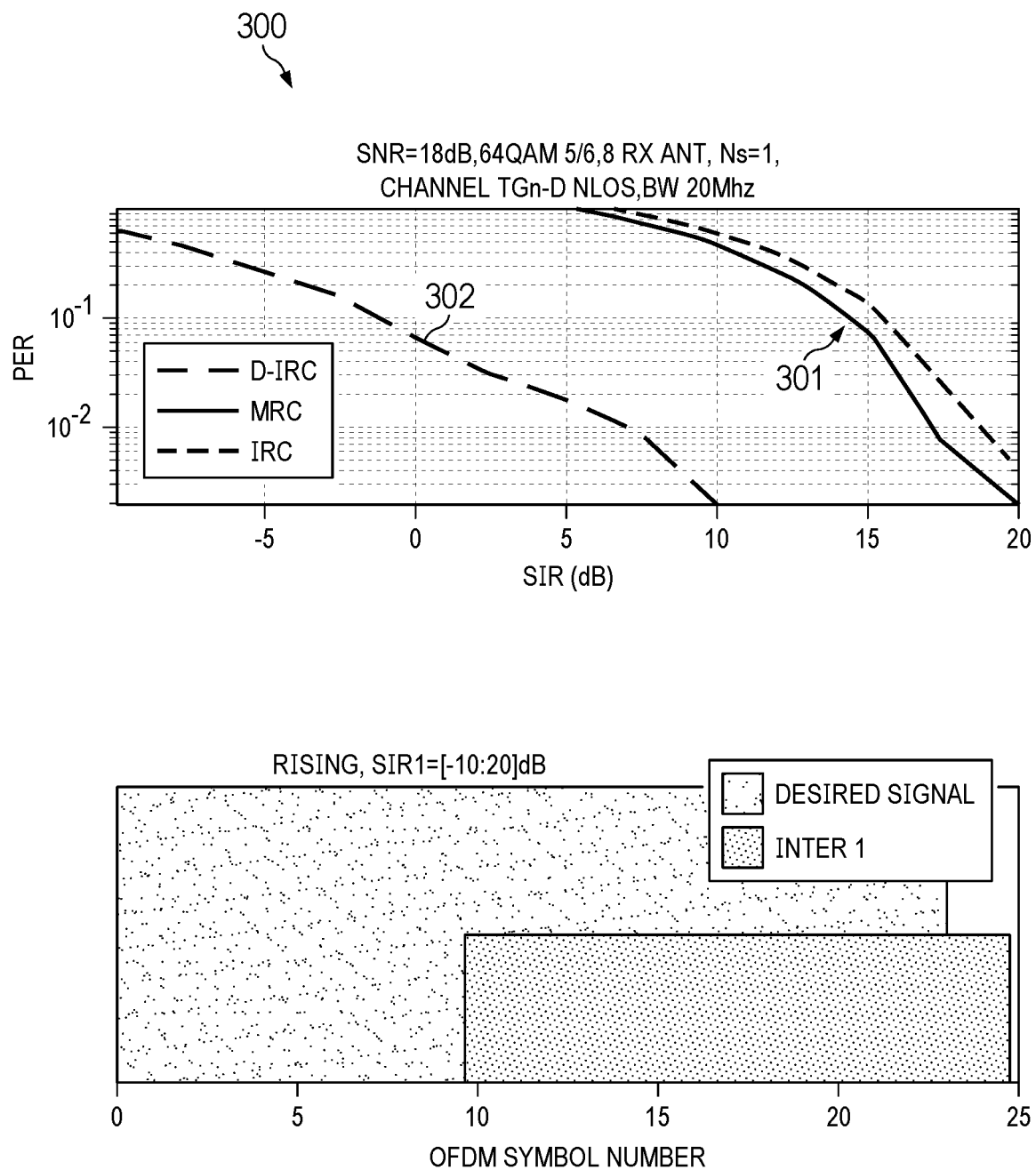
FIG. 3 shows of a diagram illustrating a comparison of the performance of D-IRC to MRC and IRC.

Reference is made to FIG. 3, which is a schematic view of a diagram 300 illustrating a comparison of the performance of D-IRC to MRC and IRC.

In the diagram 300 of FIG. 3, a comparison of the performance of D-IRC (performed by the device 100) to MRC and IRC is illustrated, in the case of fixed SNR of 18 dB for 64QAM, rate 5/6. The receiver device (RX) uses 8Rx antennas and the channel is TGn-D NLOS. It can be derived that, there is a gain of more than 15 dB. Moreover, the D-IRC (the device 100) enables working with interferer which is even stronger than desired signal. The simulation results presented so far showed the D-IRC gain in terms of PER for some chosen MCSs. In order to better understand the real gain of D-IRC in terms of throughput, here, a different approach is taken into account. For example, a determined realistic scenario of an AP with four receiving (RX) antennas receiving a packet from a STA with two transmitting (TX) antennas for a certain fixed SNR may be assumed. Moreover, another AP/Station does not sense the STA, and starts transmission somewhere during the desired packet (rising interferer). Furthermore, for each SIR value, it may be determined, over all possible MCSs with one or two spatial streams and the MCS that maximizes the goodput may be found.

For example, it may be assumed that the interferer transmits two spatial streams and polarized antennas are used by the AP, the station, and the interferer.

Also, this process may be performed, one time with D-IRC being "on" and one time with D-IRC being "off". Afterwards, the goodput between these two options may be compared. In the diagram 300 of FIG. 3, a comparison of the performance of D-IRC being "on" and when the D-IRC being "off", in the four RX antenna case, in terms of maximum goodput is illustrated.

For example, as it is indicated with the reference 301, the standard techniques enable working only when the interference is much weaker than the desired signal: SIR>~14 dB.

Moreover, as it is indicated with the reference 302, the D-IRC allows working when interference is as strong as the desired signal or even stronger.

Figure 4:
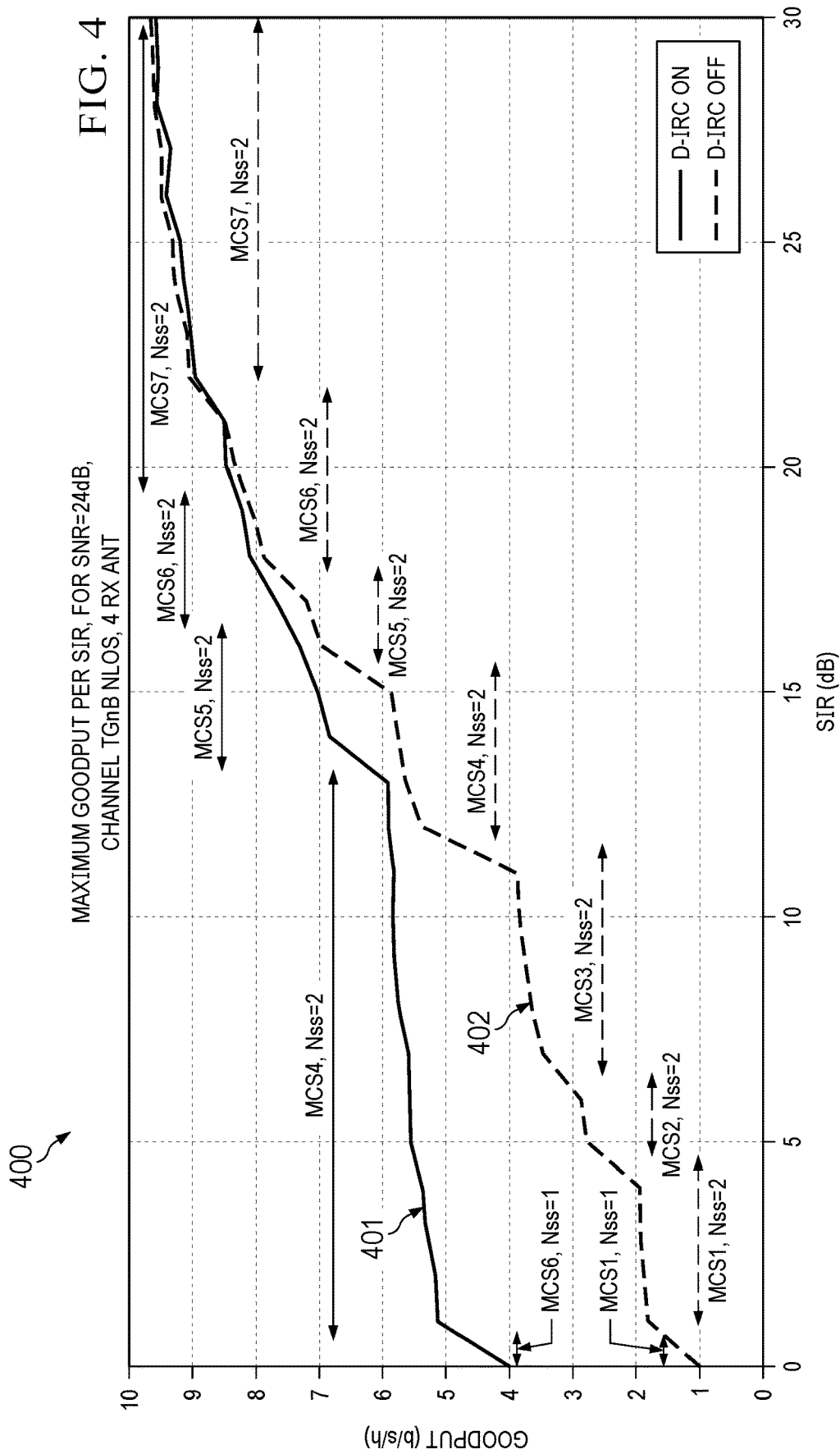
FIG. 4 schematically illustrates a very significant gain in goodput for low and medium SIR.

Reference is made to FIG. 4, which is a schematic view of a diagram 400 illustrating maximum goodput per SIR for D-IRC on (one iteration) and D-IRC off with PPM offset and sampling offset.

The diagram 400 of FIG. 4 illustrates a very significant gain in goodput for low SIR, which decreases as SIR increases, until the gain vanishes for SIR~=SNR. The gain of when the D-IRC being "on" 401 relative to when the D-IRC being "off" 402 remains significant at moderate SIRs (e.g., ~50% @SIR10-11 dB).

Moreover, in some embodiments of this disclosure, there is no negative gain (no degradation when there is no interferer or there is static interferer).

Figure 5:
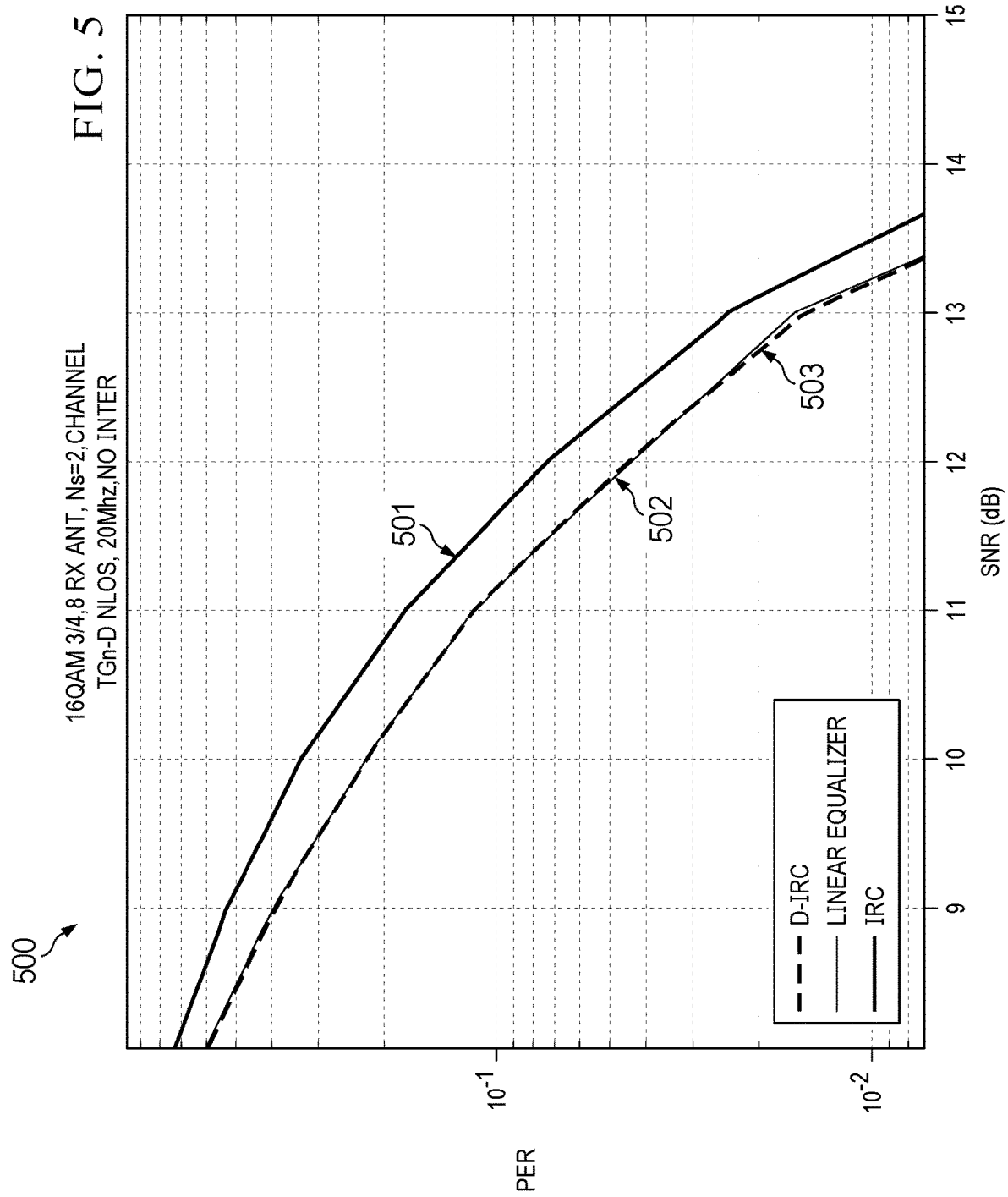
FIG. 5 shows a diagram illustrating a comparison of the performance of D-IRC to that of IRC/MRC in the case that there is no interference.

Reference is made to FIG. 5, which is a schematic view of a diagram 500 illustrating a comparison of the performance of D-IRC 503 to that of IRC/MRC 501, 502 in the case that there is no interference. It can be seen that there is no degradation relative to MRC.

Moreover, in some embodiments of this disclosure, with respect to the computational complexity, the D-IRC usually requires less than three iterations (even one iteration gives considerable gain) so it is feasible in terms of complexity.

Figure 6:
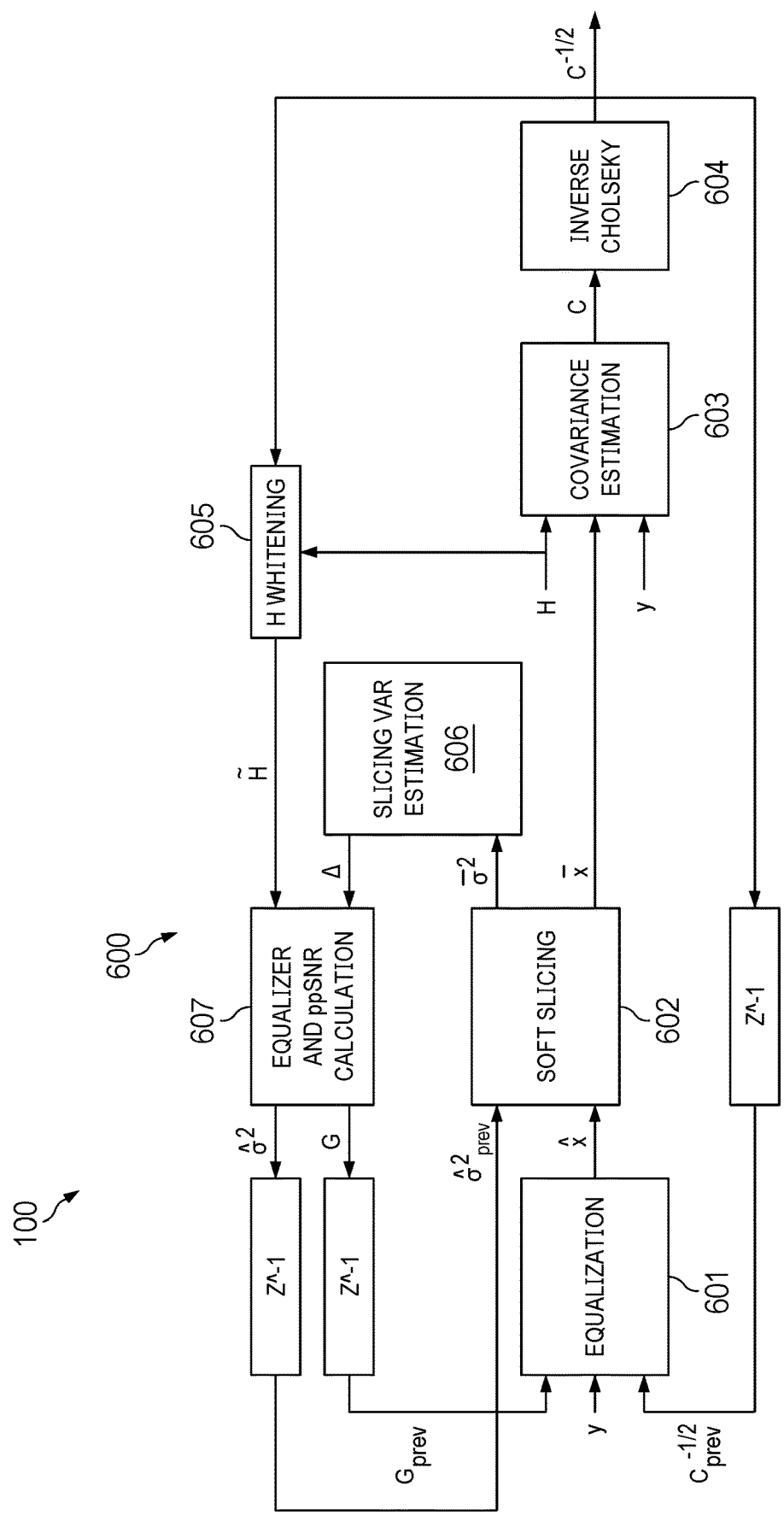
FIG. 6 shows of a D-IRC block diagram.

Reference is made to FIG. 6, which is a schematic view of a D-IRC block diagram 600.

The device 100 may provide (e.g., perform) the D-IRC algorithm, for example, as it is illustrated in diagram 600 of FIG. 6. In some embodiments, the D-IRC algorithm may be performed by the device 100.

The D-IRC block diagram 600 may include several variables which are briefly defined as follows: for a given matrix A, the variable $[A]_{i,j}$ denotes the element in the $i^{th}$ row and $j^{th}$ column of the matrix A. For a given square matrix A, the variable diag(A) denotes the column vector resulted from taking its diagonal elements.

For a given vector a, the variable $[a]_i$ denotes the $i^{th}$ element of the vector a. For a given vector a, the variable diag(a) denotes the resulted diagonal matrix such that the $[diag(A)]_{i,i}=[a]_i$.

Moreover, 1 denotes a vector of all ones (its dimension is implicitly implied from the equation). $N_r$ denotes the number of Rx antennas and $N_s$ denotes the number of spatial streams. Furthermore, M and $d_{min}$ denote the constellation size and constellation minimum distance, respectively.

In the following, for the sake of illustration, an embodiment of this disclosure is discussed for the case that all streams have the same constellation. However, the embodiments of this disclosure are not limited to the above mentioned case, and the results can be extended to the more general case.

For instance, the SCs are divided into sub-bands, each sub-band has N subcarriers. Moreover, a single covariance matrix is estimated per each sub-band (and also inverse Cholesky of the covariance matrix), this reduces complexity and also necessary for good covariance estimation. In the calculation of each sub-band's covariance matrix, the N sub-carriers of the sub-band are used and up to Ñ subcarriers from the adjacent sub-bands. Here, for simplicity we assume Ñ=0.

Table I below summarizes the different variables (vectors, matrices, etc.) used by the D-IRC algorithm per the kth SC, and gives there dimensions and description.

TABLE I

Description of different variables of D-IRC algorithm and their dimensions

| Variable | Dimensions | Description |
|---|---|---|
| $y_k$ | $N_r \times 1$ | Received input vector for the kth SC |
| $H_k$ | $N_r \times N_s$ | Estimated channel for the kth SC |
| $C_k$ | $N_r \times N_r$ | Estimated noise covariance matrix of the kth SC (same covariance for a sub-band of N SC) |
| $G_k$ | $N_s \times N_r$ | LMMSE equalizer for the kth SC. |

TABLE I-continued

Description of different variables of D-IRC algorithm and their dimensions

| Variable | Dimensions | Description |
|---|---|---|
| $C_k^{-1/2}$ | $N_r \times N_r$ | Inverse Cholesky of the covariance matrix $C_k$ (same inverse Cholesky for a band of N SC) |
| $\hat{\sigma}_k^2$ | $N_s \times 1$ | Post processing noise variance (1/ppSNR) of the kth SC |
| $\hat{x}_k$ | $N_s \times 1$ | Estimated TX vector for the kth SC (at the LMMSE equalizer output) $\hat{x}_k = G_k C_k^{-1/2} y_k$ |
| $\bar{x}_k$ | $N_s \times 1$ | Soft symbols for the kth SC |
| $\bar{\sigma}_k^2$ | $N_s \times 1$ | Soft slicing variance for the kth SC |
| $\Delta_k$ | $N_s \times N_s$ | Diagonal matrix whose diagonal holds the average of $\bar{\sigma}_k^2$ over the whole sub-band (same matrix for a sub-band of N SC) |
| $\tilde{H}_k$ | $N_r \times N_s$ | Whitened channel for the kth SC, $\tilde{H}_k = C_k^{-1/2} H_k$ |
| $G_{prev,k}$ | $N_s \times N_r$ | The equalizer calculated at previous iteration if iteration index > o, and in previous symbol if iteration index = o |
| $C_{prev,k}^{-1/2}$ | $N_r \times N_r$ | Inverse Cholesky calculated at previous iteration if iteration index > o, and in previous symbol if iteration index = o |
| $\hat{\sigma}_{prev,k}^2$ | $N_s \times 1$ | The post processing noise variance vector calculated at previous iteration if iteration index > o, and in previous symbol if iteration index = o |

The inputs of the D-IRC algorithm may be, for each OFDM symbol $y_k$ of that symbol and $H_k$ (which may be calculated at the preamble). In addition, at the first symbol after preamble, the $G_{prev}$, $C_{prev}^{-1/2}$ and $\hat{\sigma}_{prev}^2$ are initialized to G, $C^{-1/2}$, and $\hat{\sigma}^2$ from the preamble. The outputs of the D-IRC algorithm are G, $C^{-1/2}$ and $\hat{\sigma}^2$ (where linear decoder is assumed for now).

In the diagram 600 depicting the D-IRC algorithm, the SC index k is omitted for the sake of simplicity.

The D-IRC block diagram 600 may comprise several sub-blocks including the equalization sub-block 601, the soft-slicing sub-block 602, the covariance estimation sub-block 603, the inverse Cholesky sub-block 604, the H whitening sub-block 605, the Slicing var calculation sub-block 606, and the Equalizer and pp SNR calculation sub-block 607.

Moreover, the D-IRC algorithm may perform a predefined number of L iterations and an additional equalization step each OFDM symbol. Each iteration comprises performing equalization, soft-slicing, covariance estimation, inverse Cholesky, H whitening, Slicing var calculation, and Equalizer and pp SNR calculation steps. At the first iteration, the equalizer, inverse Cholesky matrix and post processing noise variance are taken from previous symbol. Otherwise, they are taken from previous iteration.

Let us elaborate on the sub-blocks of the D-IRC algorithm.

For instance, the D-IRC algorithm may comprises several sub-blocks in which in each sub-blocks a respective operation is performed.

The equalization sub-block 601 may whiten the $y_k$ and then applies the equalization matrix $G_k$, according to Eq. (10) as follows:

$$\hat{x}_k = G_k C_{prev,k}^{-1/2} y_k. \qquad \text{Eq. (10)}$$

In some embodiments of this disclosure (for example, the multi-stream case), it seems better to first whiten $y_k$, i.e., according to Eq. (11) as follows:

$$\tilde{y}_k = C_{prev,k}^{-1/2} y_k \qquad \text{Eq. (11)}$$

and then equalize by $G_k$.

In some embodiments of this disclosure (for example, the single stream case), it may be sometimes better to first calculate, i.e., according to Eq. (12) as follows:

$$w^H = G_k C_{prev,k}^{-1/2} \qquad \text{Eq. (12)}$$

and then apply $$\hat{x}_k = w^H y_k. \qquad \text{Eq. (13)}$$

The soft-slicing sub-block 602 applies on the $r^{th}$ stream the soft slicing function as follows:

$$[\bar{x}]_r = [\lambda]_r + \tanh\left(\frac{d_{min}\mathrm{Re}([\hat{x}-\lambda]_r)}{[\hat{\sigma}^2]_r}\right) + j\tanh\left(\frac{d_{min}\mathrm{Im}([\hat{x}-\lambda]_r)}{[\hat{\sigma}^2]_r}\right), \qquad \text{Eq. (14)}$$

where $$\lambda = \frac{d_{min}}{2}\min\left(\max\left(2\left\lfloor\frac{\mathrm{Re}(\hat{x})}{d_{min}}-\frac{1}{2}\right\rfloor+2, -\sqrt{M}+2\right), \sqrt{M}-2\right) + \qquad \text{Eq. (15)}$$

$$j\frac{d_{min}}{2}\min\left(\max\left(2\left\lfloor\frac{\mathrm{Im}(\hat{x})}{d_{min}}-\frac{1}{2}\right\rfloor+2, -\sqrt{M}+2\right), \sqrt{M}-2\right)$$

and all the operations above on the vector $\hat{x}$ may be understood as element-wise.

Note that in constellations higher than QPSK, the soft slicing is an approximation of the full conditional mean. When treating the real and imaginary components of $[\bar{x}]_r$ as PAM constellations, only the 2 closest points are considered and the remaining points ignored. Simulation results show that this approximation does not have any noticeable effect on performance.

The soft slicing noise variance $\bar{\sigma}^2$ is approximated as:

$$[\bar{\sigma}^2]_r = \frac{d_{min}^2}{2} = |[\lambda - \bar{x}]_r|^2. \qquad \text{Eq. (16)}$$

To see that, note that in the case of QPSK:

$$[\bar{\sigma}^2]_r = E([\hat{x}-\bar{x}]_r|^2|y) = E(|[\hat{x}]_r|^2|y) - 2\,\mathrm{Re}(E([\hat{x}]_r[\bar{x}]_r^*)) + |[\bar{x}]_r|^2 = 1 - |[\bar{x}]_r|^2. \qquad \text{Eq. (17)}$$

In the case of higher modulations, the same approximation of considering only the two closest points in each component of $[\bar{x}]_r$ yields the desired result.

The D-IRC block diagram may further comprise the covariance estimation sub-block 603. Here, the SCs are divided into sub-bands and a single covariance is estimated per band.

For example, when fixing a sub-band and when k denote a SC in the sub-band, then the covariance is estimated according to:

$$C_k = \frac{1}{N}\sum_i (y_i - H_i x_i)(y_i - H_i x_i)^H + \beta I, \qquad \text{Eq. (18)}$$

where the summation is over all N SC in the sub-band. The $\beta$ parameter is needed to account for some necessary diagonal loading.

A more accurate estimation for noise covariance may be:

$$\tilde{C}_k = \frac{1}{N}\sum_i (y_i - H_i x_i)(y_i - H_i x_i)^H + \beta I + H_k \Delta_k H_k^H. \qquad \text{Eq. (19)}$$

So in fact when $C_k$ is used instead of the more accurate $\tilde{C}_k$, the resulted noise covariance matrix is not the identity matrix.

On the other hand, when using the more accurate version $\tilde{C}_k$, results in losing the property that the estimated covariance is fixed for the whole sub-band and significantly increases the complexity. This problem may be tackled by using the less accurate $C_k$ and compensating for the $H_k \Delta_k H_k^H$ term in the equalizer and post processing noise variance calculations.

The Inverse Cholesky sub-block 604 performs Cholesky decomposition and then inversion of the resulted lower triangular matrix; it outputs the matrix $C_k^{-1/2}$.

The H whitening sub-block 605 simply calculates Eq. (20) as follows:

$$\tilde{H}_k = C_k^{-1/2} H_k. \qquad \text{Eq. (20)}$$

The Slicing var estimation sub-block 606 estimates the variance of the soft symbols per stream and outputs it as the diagonal of the diagonal matrix $\Delta_k$. This is done by averaging over all SCs in the band, i.e., according to Eq. (21) as follows:

$$\Delta_k = \mathrm{diag}\left(\frac{1}{N}\sum_i \sigma_i^2\right), \qquad \text{Eq. (21)}$$

where the summation is over all subcarriers in the band.

The D-IRC block diagram may further comprise the equalizer and PP SINR calculation sub-block 607. For example, First, the $H_k \Delta_k H_k^H$ term mentioned earlier may be ignored Then in the multi-stream case, the following equations may be derived:

$$\hat{\sigma}_k^{2'} = \mathrm{diag}(\gamma_k')^{-1}\,\mathrm{diag}(R_k') \qquad \text{Eq. (22)}$$

$$G_k' = \mathrm{diag}(\gamma_k')^{-1} R_k' \tilde{H}_k^H, \qquad \text{Eq. (23)}$$

where $$R_k' = (\tilde{H}_k^H \tilde{H}_k + I)^{-1} \qquad \text{Eq. (24)}$$

and $$\gamma_k' = 1 - \mathrm{diag}(R_k'). \qquad \text{Eq. (25)}$$

This is reduced in the single stream case to:

$$\hat{\sigma}_k^{2'} = \frac{1}{\|\tilde{H}_k\|^2} \qquad \text{Eq. (26)}$$

$$G_k' = \frac{\tilde{H}_k^H}{\|\tilde{H}_k\|^2}. \qquad \text{Eq. (27)}$$

Next, by taking into account the $H_k \Delta_k H_k^H$ term. It can be shown that:

$$\hat{\sigma}_k^2 = \mathrm{diag}(\gamma_k)^{-1}\mathrm{diag}(R_k) + \mathrm{diag}(\Delta) \qquad \text{Eq. (28)}$$

$$G_k = \mathrm{diag}(\gamma_k)^{-1} R_k \tilde{H}_k^H, \qquad \text{Eq. (29)}$$

where $$R_k = (\tilde{H}^H \tilde{H} + (I+\Delta)^{-1})^{-1} \text{ and } \gamma_k = 1 - (I+\Delta)^{-1}\mathrm{diag}(R_k). \qquad \text{Eq. (30)}$$

In the single stream case this reduces into:

$$\hat{\sigma}_k^2 = \frac{1}{\|\tilde{H}_k\|^2} + \Delta \qquad \text{Eq. (31)}$$

$$G_k = \frac{\tilde{H}_k^H}{\|\tilde{H}_k\|^2}. \qquad \text{Eq. (32)}$$

Note: in the single stream case the $\Delta$ correction only effects $\hat{\sigma}_k^2$ and in fact $\hat{\sigma}_k^2 = \hat{\sigma}_k^{2\prime} + \Delta$ and $G_k = G_k'$. In the multi-stream, this is not true anymore, but in fact holds approximately, in the sense that the whole $\Delta$ correction mainly effects the calculation of $\hat{\sigma}_k^2$. Indeed, if assuming $[\Delta]_{r,r} < 1$ for $r = 1, \ldots, N_s$ then it may be possible to approximate $I + \Delta \approx I$ and it may be possible to get $R_k \approx R_k'$ and $\gamma_k \approx \gamma_k'$. So in fact, $$\hat{\sigma}_k^2 \approx \hat{\sigma}_k^{2\prime} + \text{diag}(\Delta) \text{ and } G_k \approx G_k'. \qquad \text{Eq. (33)}$$

This can enable to work with standard MMSE equalizer and not make the necessary modifications. Note however, that the $\Delta$ term is significant in post-processing noise variance calculations and without it, the calculated post-processing noise variance $\hat{\sigma}_k^2$ can be significantly underestimated.

Figure 7:
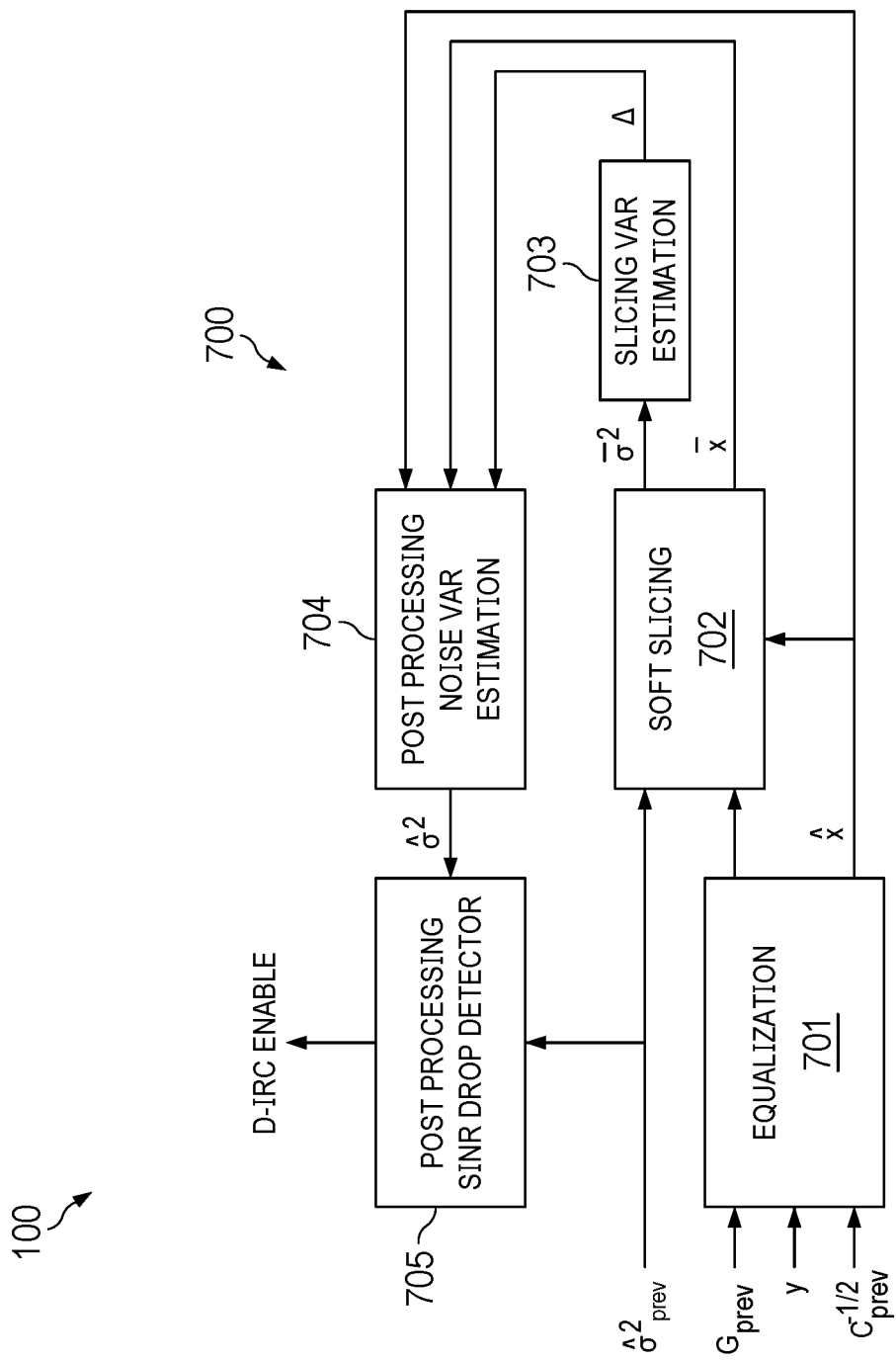
FIG. 7 is a schematic view of a D-IRC SNR detector processing until SINR drop is detected.

Reference is made to FIG. 7 which is a schematic view of a block diagram 700 illustrating a D-IRC SNR detector processing until the SINR drop is detected.

The D-IRC SNR detector may determine whether to enable the D-IRC or not; this is important in order to avoid degradation in the case of no-interference and the case of static interference relative to non-IRC decoding and IRC, respectively.

The D-IRC SNR detector can make decisions separately on 20 Mhz bands, i.e., it may employ D-IRC on 20 Mhz bands and non-IRC decoding on another band (other granularities are also possible). In the following, is focused on a single 20 Mhz band.

Initially the processing starts from non-IRC or plain vanilla IRC, where non-IRC is the default choice and IRC is the choice in case that it is determined there is an interference on the preamble. Each OFDM symbol a detector is used to detect a drop in post-processing SINR level. Moreover, only if such a drop is detected the processing switches from non-IRC/IRC to the D-IRC and performs the D-IRC throughout the remaining symbols. Thus in the case of no interference or static interference, the performance should remain similar to that of non-IRC and IRC, respectively.

Here, the processing is described up to the OFDM symbol in which dynamic interference is detected (afterwards the algorithm becomes D-IRC). The algorithm is based on part of the calculations done in the first iteration of D-IRC (mainly the soft-slicing) and a detector that detects post-processing SINR drop. If at a certain symbol the detector detects a drop, it outputs D-IRC enable=1; the D-IRC completes the first iteration and continues with remaining iterations, and in the remaining symbols it works as plan D-IRC.

In the diagram 700, the $G_{prev}$ is the equalizer calculated on the preamble and it is not recalculated, unless SINR drop is detected. Also $C_{prev}^{-1/2}$ is based on the preamble. It should be understood as the inverse Cholesky of the covariance matrix estimated on the preamble, in the case of starting from IRC on the preamble. Moreover, in the case of non-IRC, it should be understood as a diagonal matrix whose $i^{th}$ diagonal element holds $$\frac{1}{\sigma_i},$$

where $\sigma_i$ is the estimated noise variance of the $i^{th}$ RX antenna. Finally, $\hat{\sigma}_{prev}^2$ is also taken from the preamble and is the post-processing noise variance vector and is also averaged (once during preamble) over all SCs in the 20 MHz band to yield the $\lambda_{prev}$.

The D-IRC sub-blocks that are employed each symbol are the equalization 701, which yields $\hat{x}$, the soft-slicing 702, which yields $\bar{x}$ and $\bar{\sigma}^2$, and the slicing var estimation 703, which yields $\Delta$. The above mentioned sub-blocks may perform similar operations as the corresponding sub-blocks of the D-IRC algorithm 600 of FIG. 6. Moreover, the new sub-blocks are the post-processing noise var estimation 704 and post processing SINR drop detector 705 described below.

The post-processing noise variance estimation sub-block 704 works on each sub-band. The inputs of the post-processing noise variance estimation sub-block 704 are $\bar{x}$ and $\bar{\sigma}^2$ for all SCs in the given sub-band and $\Delta$ per sub-band.

The output of the post-processing noise variance estimation sub-block 704 is:

$$\hat{\sigma}^2 = \frac{1}{N} \sum_i |\bar{x}_i - \hat{x}_i|^2 + \Delta, \qquad \text{Eq. (34)}$$

where the sum is over all SCs in the sub-band.

The Post-processing SINR drop detector sub-block 705 averages $\hat{\sigma}^2$ over all sub-bands to yield $\lambda$ and compares it to $\lambda_{prev}$. If max $(\lambda - \lambda_{prev}) \geq$ SINR_DROP_TH, then D-IRC enable=1, otherwise it equals 0.

Figure 8:
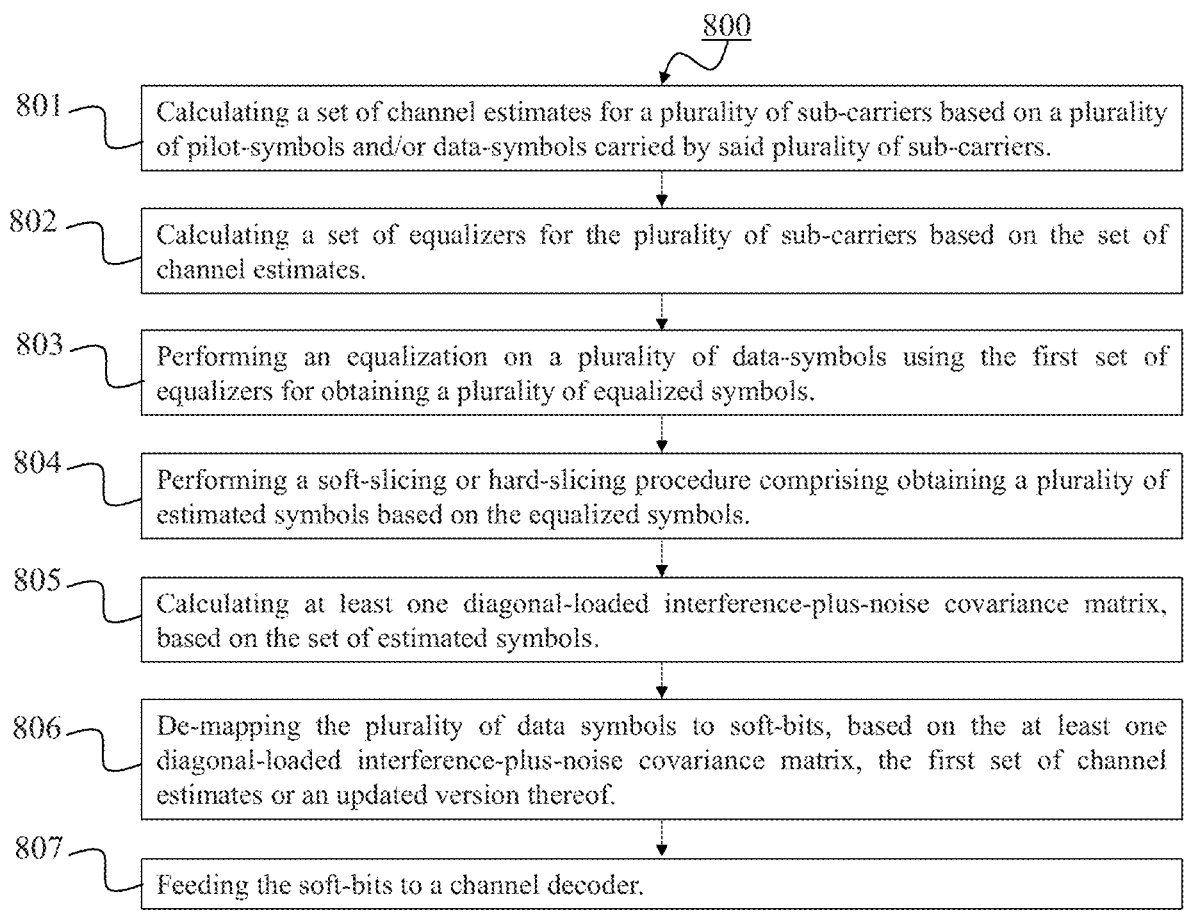
FIG. 8 is a flowchart of a method for dynamically reducing interference for a multi-carrier communication receiver, according to an embodiment of this disclosure.
Figure 9:
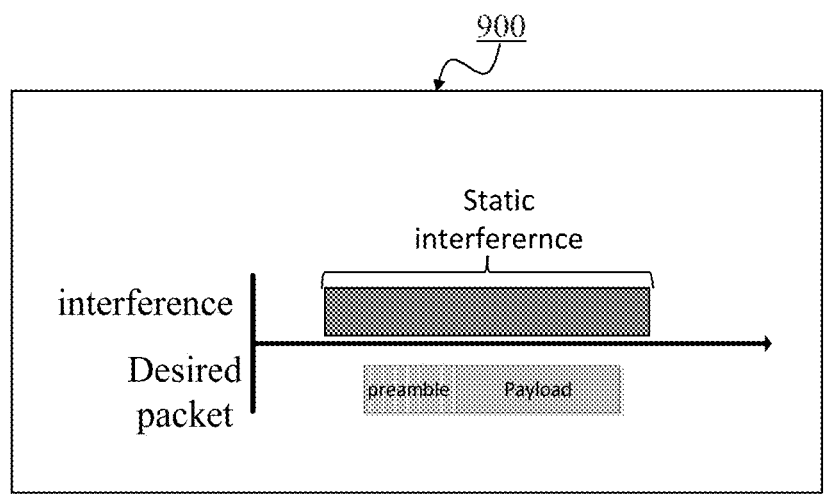
FIG. 9 shows a diagram of static interference.
Figure 10:
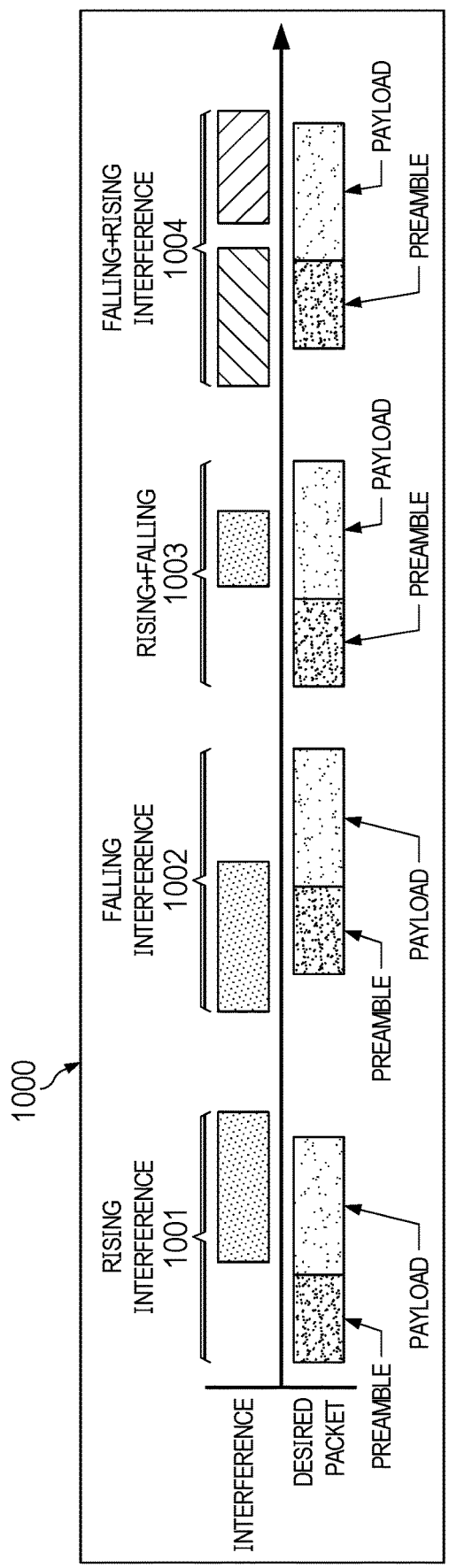
FIG. 10 shows a diagram of dynamic interferences including Rising, Falling, Rising+falling, and Falling+rising interferences.
Figure 11:
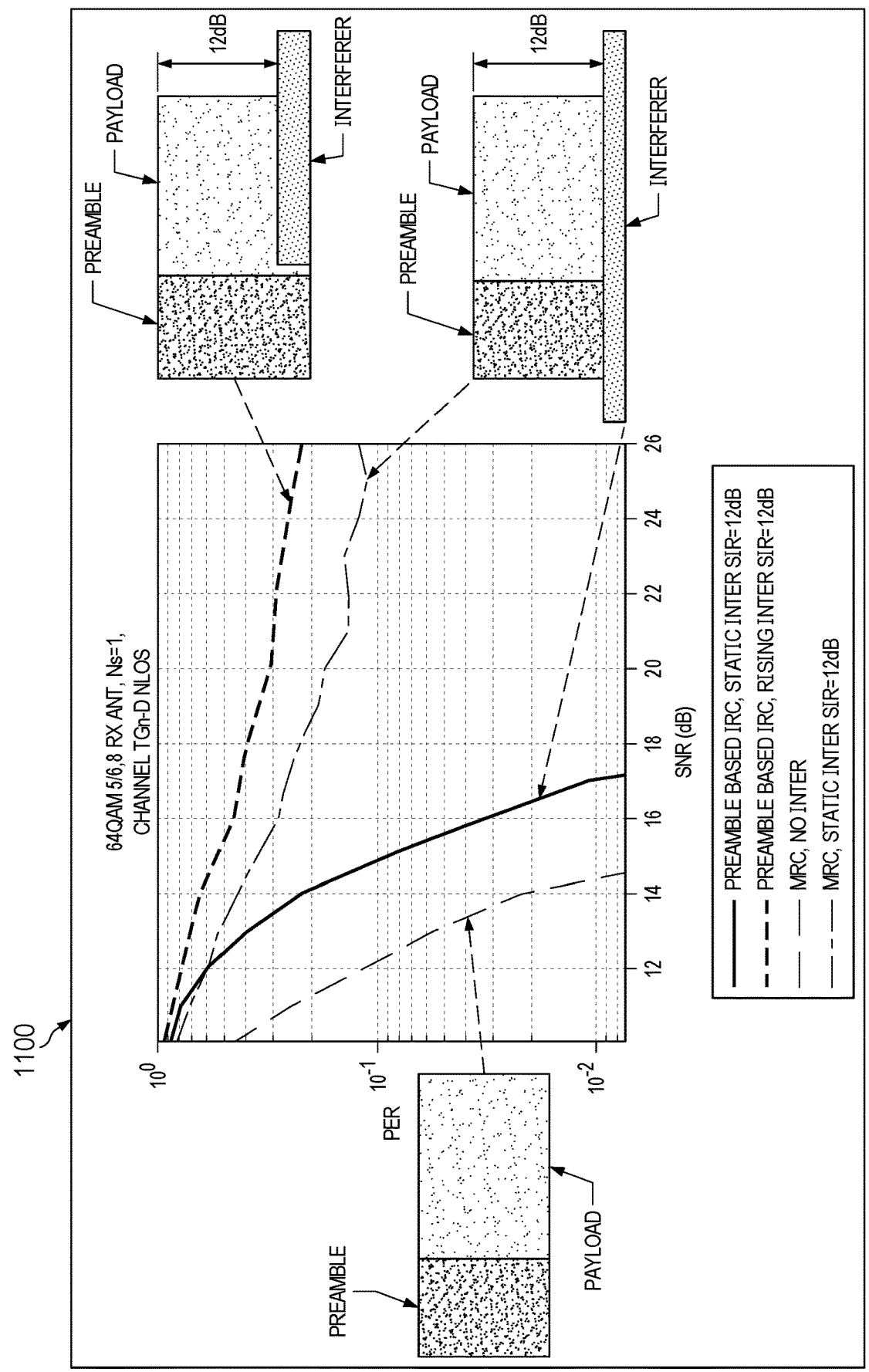
FIG. 11 shows a diagram illustrating MRC and IRC performance in the case of no interference, static interference, and rising interference.
Figure 12:
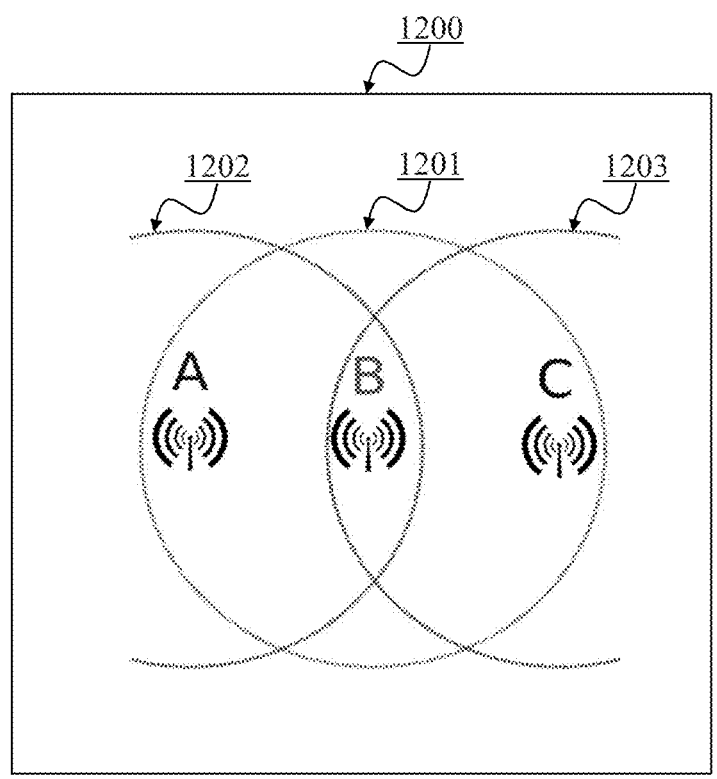
FIG. 12 shows a diagram illustrating a Hidden-node problem.
Figure 13:
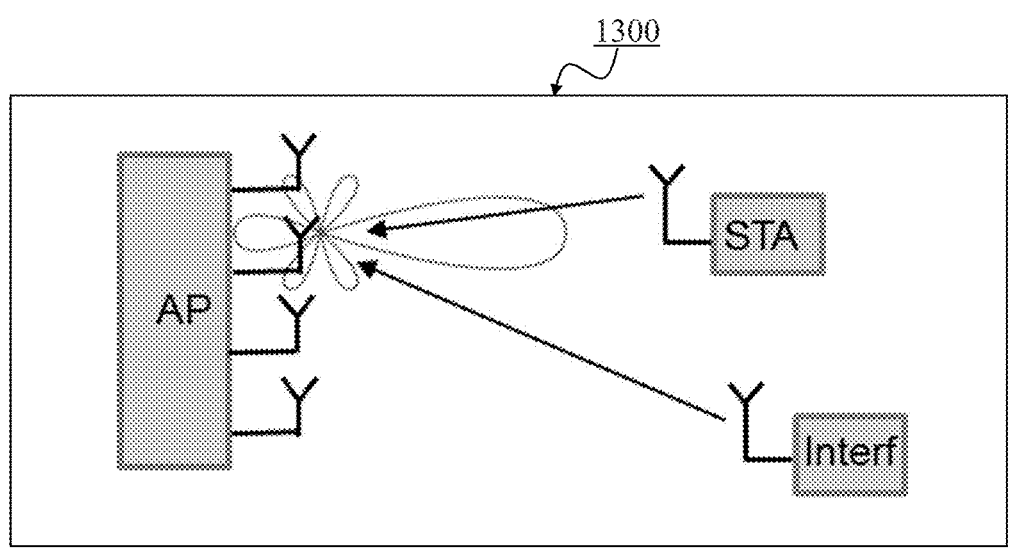
FIG. 13 schematically illustrates a conventional AP receiving WiFi packets from an STA in the presence of interferer.

FIG. 8 shows a method 800 according to an embodiment of this disclosure for dynamically reducing interference for a multi-carrier communication receiver. The method 800 may be carried out by the device 100, as it described above.

The method 800 comprises a step 801 of calculating a set of channel estimates 101 for a plurality of sub-carriers no based on a plurality of pilot-symbols and/or data-symbols carried by said plurality of sub-carriers 110.

The method 800 further comprises a step 802 of calculating a set of equalizers 102 for the plurality of sub-carriers no based on the set of channel estimates 101.

The method 800 further comprises a step 803 of performing an equalization on a plurality of data-symbols using the set of equalizers 102 for obtaining a plurality of equalized symbols 103.

The method 800 further comprises a step 804 of performing a soft-slicing or hard-slicing procedure comprising obtaining a plurality of estimated symbols 104 based on the equalized symbols 103.

The method 800 further comprises a step 805 of calculating at least one diagonal-loaded interference-plus-noise covariance matrix 105, based on the set of estimated symbols 104.

The method 800 further comprises a step 806 of de-mapping the plurality of data symbols to soft-bits 106, based on the at least one diagonal-loaded interference-plus-noise covariance matrix 105, the set of channel estimates 101 or an updated version thereof.

The method 800 further comprises a step 807 of feeding the soft-bits 106 to a channel decoder.

This disclosure has been described in conjunction with various embodiments as examples as well as implementations. However, other variations can be understood and effected by those persons skilled in the art and practicing the claimed invention, from the studies of the drawings, this disclosure and the independent claims. In the claims as well as in the description the word "comprising" does not exclude other elements or steps and the indefinite article "a" or "an" does not exclude a plurality. A single element or other unit may fulfill the functions of several entities or items recited in the claims. The mere fact that certain measures are recited in the mutual different dependent claims does not indicate that a combination of these measures cannot be used in an advantageous implementation.

What is claimed is:

1. A device, comprising:
   at least one processor; and
   a non-transitory computer-readable storage medium storing a program that is executable by the at least one processor, the program comprising instructions to:
      calculate a set of channel estimates for a plurality of sub-carriers based on a plurality of pilot symbols or a first plurality of data symbols carried by the plurality of sub-carriers;
      calculate a set of equalizers for the plurality of sub-carriers based on the set of channel estimates;
      perform an equalization on a second plurality of data symbols, using the set of equalizers, to obtain a plurality of equalized symbols, wherein the first plurality of data symbols and the second plurality of data symbols are a same set of data symbols or a different set of data symbols;
      perform a soft-slicing procedure or a hard-slicing procedure comprising obtaining a plurality of estimated symbols based on the plurality of equalized symbols;
      calculate at least one diagonal-loaded interference-plus-noise covariance matrix, based on the plurality of estimated symbols;
      de-map the second plurality of data symbols to soft-bits, based on the at least one diagonal-loaded interference-plus-noise covariance matrix, the set of channel estimates, or an updated version of the set of channel estimates; and
      feed the soft-bits to a channel decoder.

2. The device according to claim 1, wherein the program further comprises instructions to:
   calculate a subsequent set of equalizers for the plurality of sub-carriers, based on the at least one diagonal-loaded interference-plus-noise covariance matrix and the set of channel estimates or the updated version of the set of channel estimates.

3. The device according to claim 2, wherein the program further comprises instructions to:
   calculate at least one whitening matrix based on the at least one diagonal-loaded interference-plus-noise covariance matrix; and
   wherein calculating the subsequent set of equalizers for the plurality of sub-carriers, based on the at least one diagonal-loaded interference-plus-noise covariance matrix and the set of channel estimates or the updated version of the set of channel estimates, comprises:
      calculating the subsequent set of equalizers for the plurality of sub-carriers based on the at least one whitening matrix, the at least one diagonal-loaded interference-plus-noise covariance matrix, and the set of channel estimates or the updated version of the set of channel estimates; and wherein de-mapping the second plurality of data symbols to soft-bits, based on the at least one diagonal-loaded interference-plus-noise covariance matrix, the set of channel estimates, or the updated version of the set of channel estimates comprises:
      de-mapping the second plurality of data symbols into soft-bits, based on the at least one whitening matrix and the at least one diagonal-loaded interference-plus-noise covariance matrix, the set of channel estimates, or the updated version of the set of channel estimates.

4. The device according to claim 3, wherein the program further comprises instructions to:
   perform a whitening operation on the second plurality of data symbols, using the at least one whitening matrix, to obtain a plurality of whitened data symbols; and
   perform a whitening operation on the set of channel estimates or the updated version of the set of channel estimates, using the at least one whitening matrix, to obtain a set of whitened channel estimates;
   wherein calculating the subsequent set of equalizers for the plurality of sub-carriers based on the at least one whitening matrix, the at least one diagonal-loaded interference-plus-noise covariance matrix, and the set of channel estimates or the updated version of the set of channel estimates comprises:
      calculating the subsequent set of equalizers for the plurality of sub-carriers based on calculating the subsequent set of equalizers for the plurality of sub-carriers based on the set of whitened channel estimates, the at least one whitening matrix, and the at least one diagonal-loaded interference-plus-noise covariance matrix; and
   wherein de-mapping the second plurality of data symbols into soft-bits, based on the at least one whitening matrix and the at least one diagonal-loaded interference-plus-noise covariance matrix, and the set of channel estimates, or the updated version of the set of channel estimates, comprises:
      de-mapping the whitened data symbols into soft-bits, based on the subsequent set of equalizers or the whitened channel estimates, the at least one whitening matrix, and the at least one diagonal-loaded interference-plus-noise covariance matrix.

5. The device according to claim 4, wherein the program comprises instructions to:
   whiten a received input vector for a determined sub-carrier (SC) based on an inverse Cholesky matrix of the at least one diagonal-loaded interference-plus-noise covariance matrix, and apply the subsequent set of equalizers on the whitened input vector for the determined SC; or
   apply the subsequent set of equalizers on an inverse Cholesky matrix of the at least one diagonal-loaded interference-plus-noise covariance matrix, to obtain a result, and apply the obtained result on a received input vector for a determined sub-carrier (SC).

6. The device according to claim 4, wherein the program comprises further instructions to:
   perform an inner-iteration procedure comprising performing a predefined number of inner-iterations, wherein each inner-iteration is performed on the same plurality of data symbols, and wherein in each inner-iteration, the following steps are performed:
      performing the equalization using the set of equalizers calculated in a previous inner-iteration, or in a case of a first inner-iteration, using the set of equalizers calculated for the plurality of sub-carriers based on the set of channel estimates, performing the soft-slicing procedure or the hard-slicing procedure, calculating the at least one diagonal-loaded interference-plus-noise covariance matrix, calculating the at least one whitening matrix, performing the whitening operation on the second plurality of data symbols, performing the whitening operation to obtain the set of whitened channel estimates, and calculating another set of equalizers.

7. The device according to claim 4, wherein the program comprises instructions to:

perform an outer-iteration procedure comprising performing a predefined number of outer-iterations, wherein each outer-iteration is performed on a different plurality of data-symbols than a previous outer-iteration, and wherein in each outer-iteration the following steps are performed:

performing the equalization using the set of equalizers calculated in a previous outer-iteration or an inner-iteration, or in a case of a first outer-iteration, using the set of equalizers calculated for the plurality of sub-carriers based on the set of channel estimates, performing the soft-slicing procedure or the hard-slicing procedure, calculating the at least one diagonal-loaded interference-plus-noise covariance matrix, calculating the at least one whitening matrix, performing the whitening operation on the second plurality of data symbols, performing the whitening operation to obtain the set of whitened channel estimates, and calculating another set of equalizers.

8. The device according to claim 7, wherein a predefined number of outer-iterations is determined based on a detected drop in per-stream post processing Signal-to-Interference-Plus-Noise Ratio (pp-SINR) level.

9. The device according to claim 4, wherein performing the whitening operation on the set of channel estimates or the updated version of the set of channel estimates, using the at least one whitening matrix, to obtain the set of whitened channel estimates, comprises:

multiplying at least one channel estimates matrix for a determined sub-carrier (SC), or an updated version thereof, by an inverse Cholesky matrix of the at least one diagonal-loaded interference-plus-noise covariance matrix.

10. The device according to claim 1, wherein calculating the at least one diagonal-loaded interference-plus-noise covariance matrix, based on the plurality of estimated symbols comprises:

calculating at least one interference-plus-noise covariance matrix; and adding a diagonal matrix to the at least one interference-plus-noise covariance matrix, to calculate the at least one diagonal-loaded interference-plus-noise covariance matrix.

11. The device according to claim 1, wherein the program further comprises instructions to:

calculate an inverse Cholesky matrix of the at least one diagonal-loaded interference-plus-noise covariance matrix.

12. The device according to claim 11, wherein the inverse Cholesky matrix is calculated by performing a Cholesky decomposition on the at least one diagonal-loaded interference-plus-noise covariance matrix.

13. The device according to claim 1, wherein the program further includes instructions to:

divide a plurality of sub-carriers (SCs) into sub-bands, wherein each sub-band comprises a predetermined number of SCs, and wherein an interference-plus-noise covariance matrix is estimated per each sub-band.

14. The device according to claim 1, wherein the program further includes instructions to:

calculate a first set of per-stream post processing Signal-to-Interference-Plus-Noise Ratio (pp-SINR) for the plurality of sub-carriers based on the plurality of pilot symbols, or the first plurality of data symbols or the set of channel estimates carried by the plurality of sub-carriers; and calculate a second set of per stream pp-SINR for the plurality of sub-carriers based on a plurality of equalized symbols and a plurality of estimated symbols.

15. The device according to claim 14, wherein the program further includes instructions to:

calculate, from the first set of per-stream pp-SINR, a single per-stream pp-SINR vector representing an average pp-SINR of the first set of per-stream pp-SINR;

calculate, from the second set of per-stream pp-SINR, a single per-stream pp-SINR vector representing an average pp-SINR of the second set of per-stream pp-SINR; and calculate a pp-SINR difference vector as the difference between the average pp-SINR of the first set of per-stream pp-SINR and the average pp-SINR of the second set of per-stream pp-SINR.

16. The device according to claim 15, wherein the program further includes instructions to:

detect a drop in pp-SINR level for the plurality of sub-carriers.

17. The device according to claim 16, wherein the drop in the pp-SINR is detected based on the pp-SINR difference vector.

18. The device according to claim 1, wherein the set of equalizers is based on a Minimum Mean Square Error (MMSE) equalizer or a Zero Forcing (ZF) equalizer.

19. A method, comprising:

calculating a set of channel estimates for a plurality of sub-carriers based on a plurality of pilot symbols or a first plurality of data symbols carried by the plurality of sub-carriers;

calculating a set of equalizers for the plurality of sub-carriers based on the set of channel estimates;

performing an equalization on a second plurality of data symbols using the set of equalizers, to obtain a plurality of equalized symbols, wherein the first plurality of data symbols and the second plurality of data symbols are a same set of data symbols or a different set of data symbols;

performing a soft-slicing procedure or a hard-slicing procedure comprising obtaining a plurality of estimated symbols based on the plurality of equalized symbols;

calculating at least one diagonal-loaded interference-plus-noise covariance matrix, based on the plurality of estimated symbols;

de-mapping the second plurality of data symbols to soft-bits, based on the at least one diagonal-loaded interference-plus-noise covariance matrix, the set of channel estimates, or an updated version of the set of channel estimates; and feeding the soft-bits to a channel decoder.

20. A non-transitory computer-readable storage medium comprising codes that are executable by a computer, wherein the codes comprise instructions for:
- calculating a set of channel estimates for a plurality of sub-carriers based on a plurality of pilot symbols or a first plurality of data symbols carried by the plurality of sub-carriers;
- calculating a set of equalizers for the plurality of sub-carriers based on the set of channel estimates;
- performing an equalization on a second plurality of data symbols using the set of equalizers, to obtain a plurality of equalized symbols, wherein the first plurality of data symbols and the second plurality of data symbols are a same set of data symbols or a different set of data symbols;
- performing a soft-slicing procedure or a hard-slicing procedure comprising obtaining a plurality of estimated symbols based on the plurality of equalized symbols;
- calculating at least one diagonal-loaded interference-plus-noise covariance matrix, based on the plurality of estimated symbols;
- de-mapping the second plurality of data symbols to soft-bits, based on the at least one diagonal-loaded interference-plus-noise covariance matrix, the set of channel estimates, or an updated version of the set of channel estimates; and
- feeding the soft-bits to a channel decoder.

* * * * *

UNITED STATES PATENT AND TRADEMARK OFFICE
CERTIFICATE OF CORRECTION

| | |
|---|---|
| PATENT NO. | : 11,784,852 B2 |
| APPLICATION NO. | : 17/703705 |
| DATED | : October 10, 2023 |
| INVENTOR(S) | : Yoav Levinbook et al. |

It is certified that error appears in the above-identified patent and that said Letters Patent is hereby corrected as shown below:

In the Claims

Column 20, Claim 4, Lines 27-31; please delete "calculating the subsequent set of equalizers for the plurality of sub-carriers based on calculating the subsequent set of equalizers for the plurality of sub-carriers based on the set of whitened channel estimates"

And insert --calculating the subsequent set of equalizers for the plurality of sub-carriers based on the set of whitened channel estimates--

Signed and Sealed this
Second Day of January, 2024

Katherine Kelly Vidal
*Director of the United States Patent and Trademark Office*